US007747562B2

(12) United States Patent
Gould et al.

(10) Patent No.: US 7,747,562 B2
(45) Date of Patent: Jun. 29, 2010

(54) VIRTUAL MULTIDIMENSIONAL DATASETS FOR ENTERPRISE SOFTWARE SYSTEMS

(75) Inventors: Michael Peter Gould, Oulston (GB); Rasmus Borgsmidt, Luxembourg (LU)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 11/564,011

(22) Filed: Nov. 28, 2006

(65) Prior Publication Data

US 2008/0046481 A1 Feb. 21, 2008

Related U.S. Application Data

(60) Provisional application No. 60/837,659, filed on Aug. 15, 2006.

(51) Int. Cl.
*G06F 17/30* (2006.01)
(52) U.S. Cl. .................... 707/602; 707/736; 707/957; 707/958
(58) Field of Classification Search .......... 707/102, 707/100, 4
See application file for complete search history.

(56) References Cited

U.S. PATENT DOCUMENTS

| 5,956,483 | A | | 9/1999 | Grate et al. |
| 6,002,874 | A | | 12/1999 | Bahrs et al. |
| 6,003,039 | A | * | 12/1999 | Barry et al. ............. 707/103 R |
| 6,151,601 | A | * | 11/2000 | Papierniak et al. ............. 707/10 |
| 6,477,536 | B1 | * | 11/2002 | Pasumansky et al. ....... 707/102 |
| 6,605,121 | B1 | | 8/2003 | Roderick |
| 6,609,123 | B1 | * | 8/2003 | Cazemier et al. ............... 707/4 |
| 6,768,995 | B2 | * | 7/2004 | Thier et al. .................. 707/100 |
| 7,162,473 | B2 | | 1/2007 | Dumais et al. |
| 7,181,450 | B2 | * | 2/2007 | Malloy et al. .................. 707/4 |
| 7,464,082 | B2 | | 12/2008 | Weiss |
| 2002/0087686 | A1 | | 7/2002 | Cronk |

(Continued)

FOREIGN PATENT DOCUMENTS

EP   1 081 611 A2   3/2001

OTHER PUBLICATIONS

Defining Report Datasets for Multidimensional Data from an SAP NetWeaver BI System, msdn, Apr. 14, 2006, p. 1.*

(Continued)

*Primary Examiner*—John R Cottingham
*Assistant Examiner*—Sherief Badawi
(74) *Attorney, Agent, or Firm*—Shumaker & Sieffert, P.A.

(57) ABSTRACT

Techniques are described for specifying virtual datasets within an enterprise software system. A computer-implemented system, for example, includes an enterprise planning system and a computing device coupled to the enterprise planning system via a network connection. The computing device includes an object store that stores a dataset, an application programming interface (API) that defines an operation for specifying the virtual dataset from the dataset, and an object model that stores a virtual dataset to the object store in response to receiving the operation defined by the API. The computing device further includes a plurality of applications that utilize the virtual dataset for a further operation defined by the API without resolving the virtual dataset. Because virtual dataset may be utilized without first resolving them, the virtual datasets may require less storage space within a memory, may automatically remain synchronous with the underlying dataset, and may quickly layer to more readily perform complicated operations.

34 Claims, 14 Drawing Sheets

U.S. PATENT DOCUMENTS

| | | | |
|---|---|---|---|
| 2002/0099866 | A1 | 7/2002 | Vlissides |
| 2002/0116213 | A1* | 8/2002 | Kavounis et al. ............... 705/1 |
| 2004/0098712 | A1 | 5/2004 | Pisupati et al. |
| 2004/0215626 | A1 | 10/2004 | Colossi et al. |
| 2005/0256896 | A1* | 11/2005 | Pfeifer et al. ............... 707/102 |
| 2005/0278378 | A1 | 12/2005 | Frank |
| 2006/0020921 | A1 | 1/2006 | Pasumansky et al. |
| 2006/0020933 | A1 | 1/2006 | Pasumansky et al. |
| 2006/0129971 | A1 | 6/2006 | Rojer |
| 2006/0143225 | A1 | 6/2006 | Brendle et al. |
| 2006/0235811 | A1 | 10/2006 | Fairweather |
| 2007/0130133 | A1* | 6/2007 | Lee et al. ....................... 707/4 |
| 2007/0188491 | A1 | 8/2007 | Denelsbeck et al. |
| 2007/0240137 | A1 | 10/2007 | Archambault et al. |
| 2008/0046481 | A1* | 2/2008 | Gould et al. ............... 707/203 |
| 2008/0071843 | A1 | 3/2008 | Papadimitriou et al. |
| 2009/0077107 | A1 | 3/2009 | Scumniotales et al. |

OTHER PUBLICATIONS

Defining Report Datasets for Relational Data from an SAP Database, msdn, Apr. 14, 2006, p. 1.*

Erich Gamma et al., Design Patterns: Elements of Reusable Object-Oriented Software, Design Patterns, pp. 257-271, XP002249829 (1995).

Erich Gamma et al., Design Patterns: Elements of Reusable Object-Oriented Software, Visitor Pattern, pp. 331-344, XP002340261 (1995).

James Noble, Classifying Relationships Between Object-Oriented Design Patterns, IEEE, Comput. Soc. US, pp. 98-107, XP010314483 (Nov. 9, 1998).

International Search Report and Written Opinion from corresponding PCT Application Serial No. PCT/US2007/017840 mailed Dec. 17, 2007 (13 pages).

U.S. Appl. No. 11/668,937, filed Jan. 30, 2007 entitled "Enterprise Performance Management Software System Having Dynamic Code Generation," by inventors Rasmus Bordgsmidt and Michael Gould.

U.S. Appl. No. 11/563,485, filed Nov. 27, 2006 entitled "Enterprise Planning and Performance Management System Providing Double Dispatch Retrieval of Multidimensional Data," by inventors Rasmus Bordgsmidt and Michael Gould.

International Preliminary Report on Patentability from corresponding PCT Application Serial No. PCT/US2007/017840 mailed Feb. 26, 2009 (8 pages).

* cited by examiner

VIRTUAL MULTIDIMENSIONAL DATASETS FOR ENTERPRISE SOFTWARE SYSTEMS

This application claims the benefit of U.S. Provisional Application Ser. No. 60/837,659, filed Aug. 15, 2006, the entire content of which is incorporated herein by reference.

TECHNICAL FIELD

The invention relates to software systems and, for example, to enterprise planning and performance management systems.

BACKGROUND

Enterprise software systems are typically, sophisticated, large-scale systems that support many, e.g., hundreds or thousands, of concurrent users. Examples of enterprise software systems include inventory management systems, budget planning systems, order management systems, inventory management systems, sales force management systems, business intelligent tools, enterprise reporting tools, project and resource management systems, and other enterprise software systems.

A computing device for a user typically connects to the enterprise software system via a computing network. The user computing device may provide an operating environment for concurrent execution of multiple planning applications that access multidimensional data stored to a cache on the computing device. Typically, the user computing device includes a cache to store datasets requested by the user. In many cases the cache stores complex, multi-dimensional datasets, i.e., data cubes, which the user computing device may download from the enterprise software system via the network connection.

Frequently, the planning applications perform operations that require access to a subset of the data within the multidimensional datasets. To perform these operations, the computing device may create and maintain additional multi-dimensional datasets within the cache to temporarily hold the subset of the data being manipulated. The additional datasets consume additional memory resources and require synchronization so as to maintain consistency with the original datasets. These data synchronization techniques may present significant overhead, which may further delay execution of the operations.

SUMMARY

In general, the invention is directed to techniques for specifying and utilizing "virtual datasets" within a software system, such as an enterprise system having one or more enterprise software applications. The virtual datasets may be referenced and manipulated as multidimensional data cubes. However, instead of storing actual multidimensional data, the virtual datasets contain software for resolving to all or portions of one or more underlying multi-dimensional data cubes when necessary. The enterprise software applications manipulate the virtual datasets in the same manner as a "real" dataset that stores multidimensional data. In this regard, the virtual datasets are generally indistinguishable from real datasets from the view of the enterprise software applications. The enterprise software applications can create virtual datasets and perform intermediate operations to manipulate the virtual datasets without necessarily resolving the virtual datasets to the multidimensional data contained within the underlying datasets. In this manner, the virtual datasets do not consume vast amounts of resources by storing multidimensional data. Further, the virtual datasets avoid any consistency and synchronization issues that may arise when separate datasets storing multidimensional data are created and manipulated.

For example, in one embodiment, the techniques provide a consistent and flexible object model interface having an application programmers interface (API) that enables a plurality of enterprise software applications to specify virtual datasets from underlying datasets and perform operations on those virtual datasets. The API accepts as inputs references to virtual datasets, possibly in combinations with references to actual datasets, and may not require that the virtual datasets be resolved, thereby allowing the applications to utilize the virtual dataset in further operations without first resolving the virtual dataset. Thus, the applications may layer further operations upon one another. Because the virtual dataset need not be resolved prior to performing further operations, the virtual datasets typically require less space in memory, may remain synchronous with the referenced dataset, and delay complex calculations until the applications demand resolution. Thus, the techniques may also significantly decrease the time necessary to perform operations through the use of virtual datasets.

As an example, the techniques may be applied to a computing device connected via an enterprise software system via a network. The computing device provides an operating environment for one or more enterprise software applications, and includes the object model interface described herein for interacting with multidimensional data cubes. The object model interface provides the API for invoking and manipulating objects in accordance with an object model that defines objects of varying types. An object store located on, or possibly remote from, the computing device stores datasets as well as virtual datasets. The enterprise software applications execute within the computing device and invoke operations of the API to create and manipulate virtual datasets. For example, the API may support a dataset selection operation to select all or a portion of a multidimensional dataset, a compound operation that combines multiple datasets, a functional operation that performs a mathematical operation on one or more datasets, a time-series operation, or an operation to produce a sequence of values according to a fixed pattern based on a start value and an increment. Each of these operations may be invoked to produce a virtual dataset.

Upon receiving the selection operation, for example, the API forwards the selection operation to the object model, which performs the selection operation on the underlying multidimensional dataset. As inputs, the selection operation may allow both datasets and virtual datasets to be specified as source of the select or as the selector. Thus, the object model may perform selection operations without first resolving the virtual datasets, i.e., resolving the reference to the underlying items of the referenced dataset. In this manner, the techniques enable the enterprise software applications to utilize a virtual dataset in subsequent selections via the API without first resolving the virtual dataset.

Similarly, the compound, function, time-series and sequence dataset operations provided by the API may be invoked so as to result in the generation of virtual datasets. The compound operation allows the applications to interact with the object model to combine any two or more datasets and/or virtual datasets and store this combination to a new virtual dataset. Using the compound operation, the applications may more easily present two or more of the datasets and/or the virtual datasets within a conventional grid of numbers or spreadsheet-like display. The function operation allows the applications to apply a defined function to two or more datasets and/or virtual datasets and exposing the result of this function through a new virtual dataset. Using the function operation, the applications may perform mathematical functions and, through layered functions, complex mathematical functions to yield particular results in the form of a new virtual dataset. Finally, the sequential time-series operation allows an application to apply a time-series function to the dataset or a virtual dataset and store the result as a new virtual dataset.

In one embodiment, a method comprises storing a dataset to an object store with an object model via an application programming interface (API) that exposes the object model, specifying a virtual dataset from the dataset via an operation defined within the API with a plurality of applications, and utilizing the virtual dataset in a further operation defined within the API without resolving the virtual dataset.

In another embodiment, a computing device comprises an object store that stores a dataset, an application programming interface (API) for invoking an operation to specify a virtual dataset from the dataset, and an object model that stores the virtual dataset to the object store in response to receiving the operation defined by the API. The computing device further comprises a plurality of applications that utilize the virtual dataset for a further operation defined by the API without resolving the virtual dataset.

In another embodiment, a system comprises an enterprise planning system and a computing device coupled to the enterprise planning system via a network connection. The computing device comprises an object store that stores a dataset, an application programming interface (API) that defines an operation for specifying the virtual dataset from the dataset, and an object model that stores a virtual dataset to the object store in response to receiving the operation defined by the API. The computing device further comprises a plurality of applications that utilize the virtual dataset for a further operation defined by the API without resolving the virtual dataset.

In another embodiment, the invention is directed to a computer-readable medium containing instructions. The instructions cause a programmable processor to store a dataset to an object store with an object model via an application programming interface (API) that exposes the object model, specify a virtual dataset from the dataset via an operation defined within the API with a plurality of applications, and utilize the virtual dataset in a further operation defined within the API without resolving the virtual dataset.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
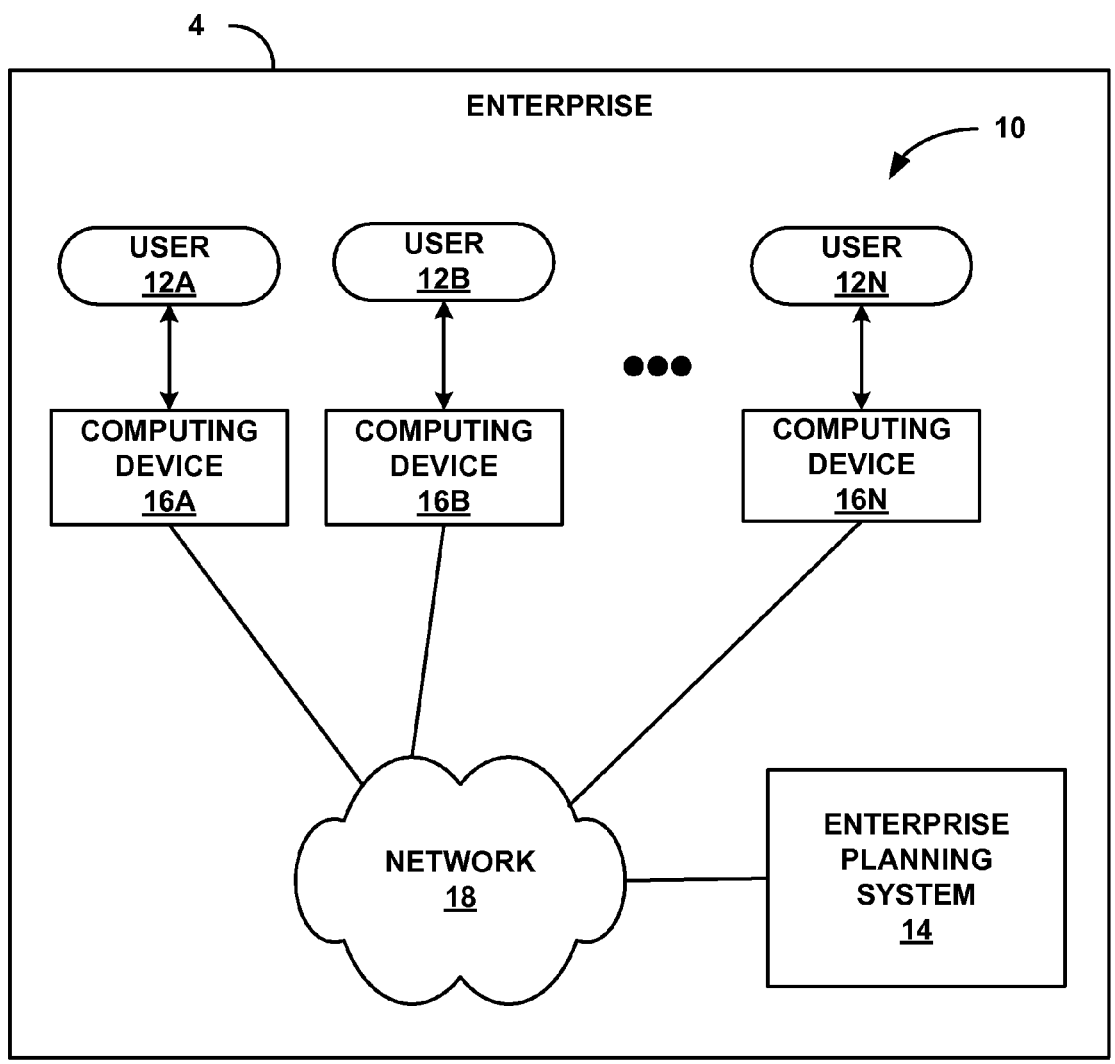
FIG. 1 is a block diagram illustrating an example enterprise having a computing environment in which a plurality of users interact with an enterprise planning system.

FIG. 1 is a block diagram illustrating an example enterprise 4 having a computing environment 10 in which a plurality of users 12A-12N (collectively, "users 12") interact with an enterprise planning system 14. In the system shown in FIG. 1, enterprise system 14 communicatively couples to a number of computing devices 16A-16N (collectively, "computing devices 16") by a network 18. Users 12 interact with their respective computing devices to access enterprise planning system 14.

For exemplary purposes, the invention will be described in reference to a performance management and enterprise planning system, such as an enterprise-wide financial management system or budget planning system. The techniques described herein may be readily applied to other software systems, including other large-scale enterprise software systems. Examples of enterprise software systems include order management systems, inventory management systems, sales force management systems, business intelligent tools, enterprise reporting tools, project and resource management systems and other enterprise software systems.

In the example embodiment of FIG. 1, enterprise planning system 14 enables and automates the reconciliation of top-down targets with detailed bottom-up forecasts for an enterprise. Enterprise planning system 14 implements and manages an enterprise planning process, which can be divided into three functions: (1) modeling, (2) contribution, and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts specify corporate target data for each node of the organizational hierarchy. Corporate target data may include financial data, revenue data, order data, inventory data, and the like, depending on the particular enterprise planning activity being carried out by the enterprise.

Next, the analysts assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise planning system 14, a reviewer that accepts or rejects contributions from the contributors, or both. The contributors and reviewers may be authorized users within the enterprise or within other entities coupled to network 18, such as suppliers or customers.

Typically, enterprise users 12 that are designated as contributors interact with enterprise planning system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning system 14 automates the reconciliation of the forecast data with the corporate target data provided by the analysts. In particular, enterprise planning system 14 operates in accordance with a defined model, i.e., the enterprise planning model created by the analysts, to provide a hierarchical planning process having multiple reconciliation levels. As each of the contributors provides his or her contribution data, enterprise planning system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning system 14 may provide more accurate enterprise planning than with conventional techniques. For example, enterprise planning system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning system 14 can aggregate contribution data in real-time, all users 12 can be presented with an accurate, up-to-date view of the numbers. Further, the architecture of enterprise planning system 14 can readily scale to thousands of users, and may be designed around best planning practices. In addition, the techniques enabling high participation by enterprise users 12, i.e., the contributors and reviewers, allowing accurate planning cycles to be reduced Enterprise users 12 may utilize a variety of computing devices to interact with enterprise planning system 14 via network 18. For example, an enterprise user may interact with enterprise planning system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning system 14 via a local area network, or may remotely access enterprise planning system 14 via a virtual private network, remote dial-up, or similar remote access communication mechanism.

Enterprise planning system 14 may utilize a "cut-down" process by which the multi-dimensional data store is "sliced" for each user 12 in accordance with the defined enterprise model. During this process, enterprise planning system 14 identifies areas of the defined model to which users 12 are assigned, either as contributors or reviewers, and "slices" the data store based on the assignments. When a given user 12 logs in and proceeds with an enterprise planning activity, enterprise planning system 14 communicates the respective data slice to the respective computing device 16 for display to the user via the extended spreadsheet application. In this fashion, enterprise planning system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, each of computing devices 16 provide a consistent and flexible object model interface by which planning applications (not shown in FIG. 1) executing within computing devices 16 may specify virtual datasets locally within computing devices 16 or remotely on enterprise planning system 14. These virtual datasets may reference a subset of one or more multi-dimensional data cubes, typically referred to as "datasets." The object model interface allows the planning applications to specify these virtual datasets, store these virtual datasets to the same object store according to the same object model as the datasets, and utilize these virtual datasets for further selections without first resolving the virtual datasets. In this manner, the object model interface remains consistent because it enables the planning applications to store both datasets and virtual datasets within the same object store and according to the same object model, unlike conventional enterprise systems that store these in separate object stores according to different object models. It is flexible because it allows the planning applications to utilize the virtual datasets for further operations without having to first resolve the virtual datasets.

The object modeling techniques, described in more detail below, provide consistent and flexible data storage that may reduce the processing time required to perform further operations upon a virtual dataset because computing devices 16 need not resolve the virtual datasets prior to requiring access to the underlying data referenced by the virtual datasets, unlike conventional enterprise systems. Moreover, the virtual datasets may require significantly less storage space because they store only a reference to items within the dimensions of the datasets not the items themselves, thereby possibly decreasing the size of memory necessary to perform enterprise planning operations or increasing the total number of datasets and virtual datasets that can be stored to a cache. Further, by only storing a reference to the items and not a copy or duplicate of the item, the virtual datasets enables enterprise system 4 to avoid time consuming execution of typical database data synchronization techniques that ensure changes to the data also result in appropriate updates to the copy of the data.

Figure 2:
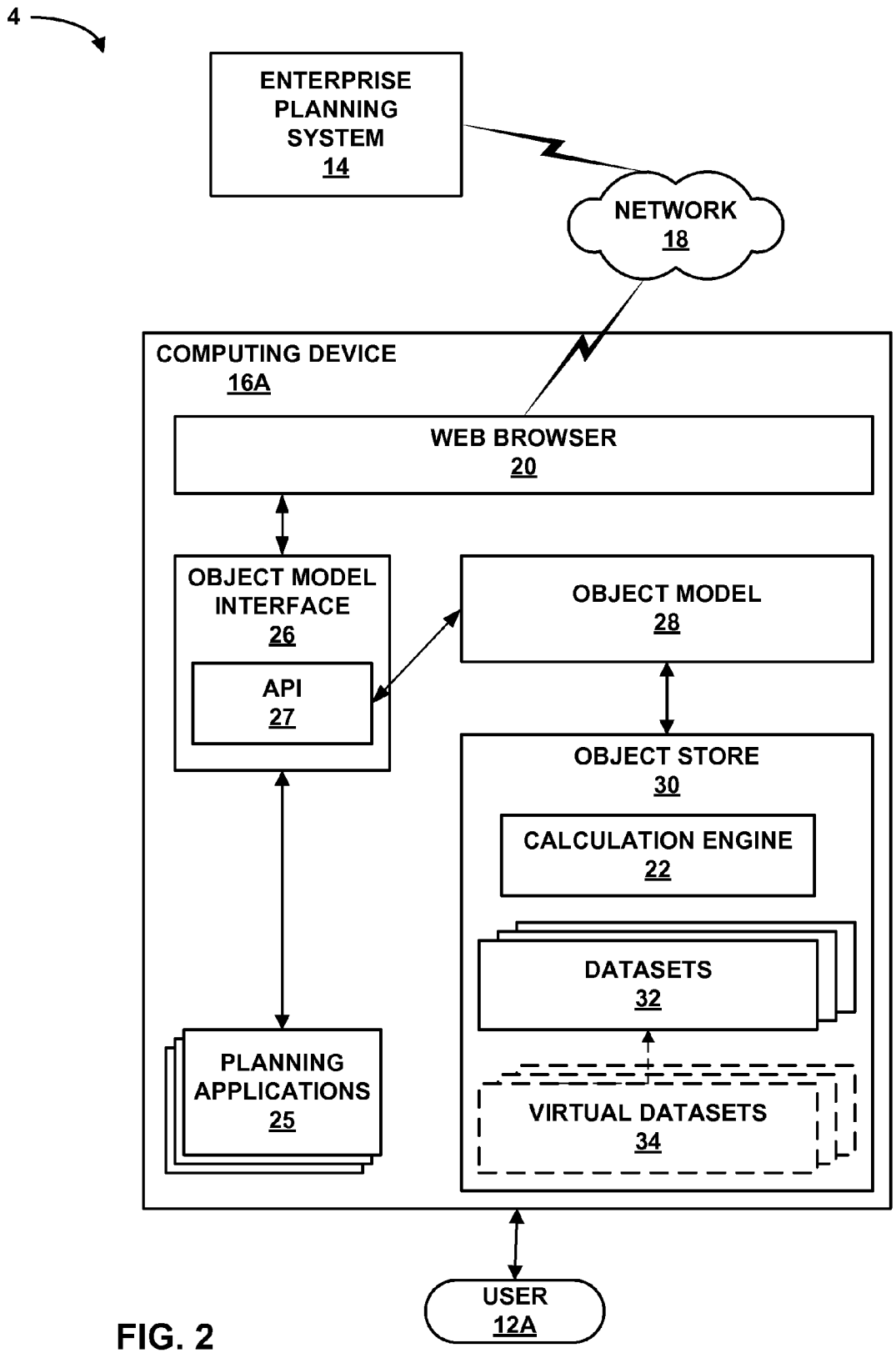
FIG. 2 is a block diagram illustrating one embodiment of a computing device for interacting with the enterprise planning system.

FIG. 2 is a block diagram illustrating one embodiment of a computing device 16A for interacting with enterprise planning system 14. In the exemplary embodiment, computing device 16A includes a web browser 20, one or more planning applications 25, an object model interface 26, an object model 28, and an object store 30. Computing device 16A includes computer-readable media to store executable instructions for causing a programmable processor to carry out the methods described herein.

Planning applications 25 represent planning applications executing on computing device 16A. For example, planning applications 25 may include reporting tools, modeling tools, spreadsheet applications, data collection templates, business intelligence tools, or other types of enterprise planning applications.

Object model interface 26 comprises an application programming interface (API) 27 that exposes object model 28. For example, object model 28 may be a metadata model for data sets 32 that represent multidimensional data from one or more data cubes. Object store 30 may comprise memory, such as a cache, that stores specific instantiations of object model 28.

In general, object model 28 represents any hierarchy of data objects, and may comprise a series of collections and objects within the collections. In other words, object model 28 may comprises a hierarchy of objects, each of which contains a collection which in turn provides access to one or more objects. Object model 28 may be wrapped to protect the objects within the collections. In this way, user 12A and planning applications 25 cannot directly alter the data within object model 28. Instead, planning applications 25 interacts with object model 28 via object model interface 26, and more particularly API 27, to specify operations object model 28 may perform. In particular, object model interface 26 receives operation calls from planning applications 25 via API 27 and may return the result of the operations to planning applications 25.

In the example of enterprise planning, user 12A may interact with web browser 20 to enter and manipulate enterprise planning data, such as budget or forecast data. Data sets 32 contain multidimensional planning data, which may include top-down targets, and bottom-up contribution data, and allows all calculations for an enterprise planning session to be performed locally by computing device 16A. Therefore, in this example, a contributor can modify his or her respective contribution data, and perform calculations necessary for the enterprise planning process without necessarily accessing enterprise planning system 14. User 12A may save the planning data locally, and submit the planning data to enterprise planning system 14 for aggregation with the planning data from other users 12.

Enterprise planning system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets.

In one embodiment, calculation engine 22 and data sets 32 are loaded for use during the enterprise planning session. Calculation engine 22 may, for example, comprises a forward calculation engine 22 wrapped in an Active X object built in an array-based language. In other embodiments, calculation engine 22 may be implemented by creating layered function datasets within object store 30.

As illustrated in FIG. 2, object store 30 includes datasets 32 and virtual datasets 34. Datasets 32 each comprises a multi-dimensional or single-dimensional object stored in accordance with object model 28. In some embodiments, object model 28 may differentiate between multi- and single-dimensional objects and instantiate single-dimensional objects as lists instead of datasets. Object model 28 may specify lists separate from datasets because the method by which the operations are performed may vary depending upon whether fields within the operations, such as the <Selector> field of the selection operation, specifies a list or a dataset. Thus, in this embodiment, object model 28 may, for example, specify a different .select( ) method, or selection operation, for list objects from the .select( ) method for dataset objects. For ease of illustration, the invention is discussed herein as if datasets may store lists, however, the principles of the invention may include embodiments wherein lists remain distinct from datasets.

Virtual datasets 34 may each store information relating to the result of performing an operation on datasets 32, as depicted by the dashed arrow to datasets 32. Virtual datasets 34 may be manipulated by planning applications 25 as if actual datasets. However, virtual datasets 34 are represented in FIG. 2 as dashed boxes and termed "virtual" because they do not actually store the result of a selection, but only information referring to the location of the actual underlying data that comprise the result. Because virtual datasets 32 do not store the result but only refer to it, virtual datasets 34 may occupy less space in a cache (not shown in FIG. 2) of computing device 16A. Further, as described below, computing device 16A need not "resolve" the result, i.e., access the underlying hierarchy of data objects referred to by virtual datasets 34, unless planning applications 25 actually require the underlying data objects. Moreover, because virtual datasets 34 only store a reference to the data objects, object store 30 need not repeatedly synchronize virtual datasets 34 upon altering, editing, and/or updating data objects referenced by virtual datasets 34 and stored within datasets 32.

Planning applications 25 specify operations that object model 28 performs upon virtual datasets 34 through interactions with object model interface 26. Specifically, API 27 of object model interface 26 provides the following syntax by which planning applications may specify, for example, a selection operation:

<Result>=<Source>.Select(<Selector>)

Planning applications 25 specify the <Result>, <Source>, and <Selector> fields of the ".Select( )" method, or selection operation. The <Source> and <Selector> fields may accept any of datasets 32 and virtual datasets 34. As described below, the selection operation may accept multiple datasets via the <Selector> field, thereby allowing planning applications 25 to specify dataset projections through the use of the selection operation, as described in more detail below. The <Selector> field may be referred to as the argument list of the selection operation, in these and other instances. The <Result> field requires that planning applications 25 specify a unique name by which planning applications 25 may later access the result of the selection operation.

Typically, the object identified by the <Result> field comprises a virtual dataset; however, in some embodiments, the object identified by the <Result> field may comprise a dataset as well. In these embodiments, object model 28 may require that object model interface 26 indicate whether to resolve the virtual dataset indicated in the <Result> field. If object model interface 26 indicates that the resulting virtual dataset should be resolved, object model 28 will build a dataset 32 containing the items referred to by the resulting virtual dataset. Planning applications 25 issue this select command to object model interface 26 via API 27, which in turn, causes object model 28 to perform the select and instantiate a new virtual dataset 34 in object store 30 containing the reference to one or more of datasets 32.

In order for object model 28 to perform the select, both the <Selector> and the <Source> fields must specify objects that are compatible, meaning that the <Selector> element type must be a member of one of the dimensions of the <Source> object. Object model 28 determines whether these are compatible prior to performing the select. For example, a <Source> object of type salary may comprise a salary dataset 32 referencing month and grade dimensions, and a <Selector> object of type grade may comprise another dataset 32 referencing an employee dimension. In this example, object model 28 determines that the <Source> salary object referencing a grade dimension and the <Selector> object having a type grade are compatible because both refer to type grade. Therefore, object model 28 performs the selection operation.

Generally, object model 28 creates a new virtual dataset 34 identified by the specified name defined in the <Result> field by planning applications 25 to which it stores the result of the selection. Next, object model 28 performs the selection and stores the resulting information referring to the locations of the underlying items of one of datasets 32 defined in the <Source> field. New virtual dataset 34 comprises an object of the same type as that of the source object, but may comprise different dimensions. Thus, continuing the above example, new virtual dataset 34 comprises an object of type salary, but this salary object references month and employee dimensions.

After performing an operation, such as the selection operation, object model 28 may return a reference to the newly selected virtual dataset 34 within object store 30 to object model interface 26, which in turn, forwards the reference to planning applications 25. Planning applications 25 may utilize this reference to virtual dataset 34, for further selections in either the <Source> or <Selector> fields or in fields of other operations, such as a compound, a function, or a sequential operations, without first resolving the newly specified virtual dataset 34. Thus, API 27 of object model interface 26 does not require that planning applications 25 only perform operations upon datasets 32 and instead allows planning applications 25 to specify virtual datasets 34.

API 27 may define other operations than the selection operation, such as the compound operation, the function operation, the time-series operation and the sequence generating operation, all of which are described below in more detail. Briefly, the compound operation allows planning applications 25 to interact with object model 28 to combine any two or more datasets 32 and/or virtual datasets 34 and store this combination to a new virtual dataset 34. Using the compound operation, planning applications 25 may more easily present two or more of datasets 32 and/or virtual datasets 34 within a conventional grid of numbers or spreadsheet-like display. The function operation allows planning applications 25 to apply a defined function to two or more of datasets 32 and/or virtual datasets 34 and store the result of applying this function to a new virtual dataset 34. Using the function operation, planning applications 25 may perform mathematical functions and, through layered functions, complex mathematical functions to yield particular results in the form of a new virtual dataset 34. The time-series operation allows applications 25 to apply time-series functions to one or more datasets 32 to generate a new virtual dataset 34. Finally, the sequence operation generates a sequence of data from a specified pattern to produce a virtual dataset 34.

Because object store 30 stores object for each of datasets 32 and virtual datasets 34 according to the same object model 28, object model interface 26 may provide a consistent API 27 by which planning applications 25 may access each of datasets 32 and virtual datasets 34. In particular, the API provides the operations discussed above by which planning applications 25 may specify virtual datasets 34 and utilize virtual datasets 34 in other operations without first resolving virtual datasets 34. Because object model 28 may perform these operations without first resolving virtual datasets 24, object model interface 26 enables planning applications 25 to layer these operations upon each other, and object model 28 need not resolve virtual datasets 34 until planning applications 25 actually require the underlying data object.

Figure 3:
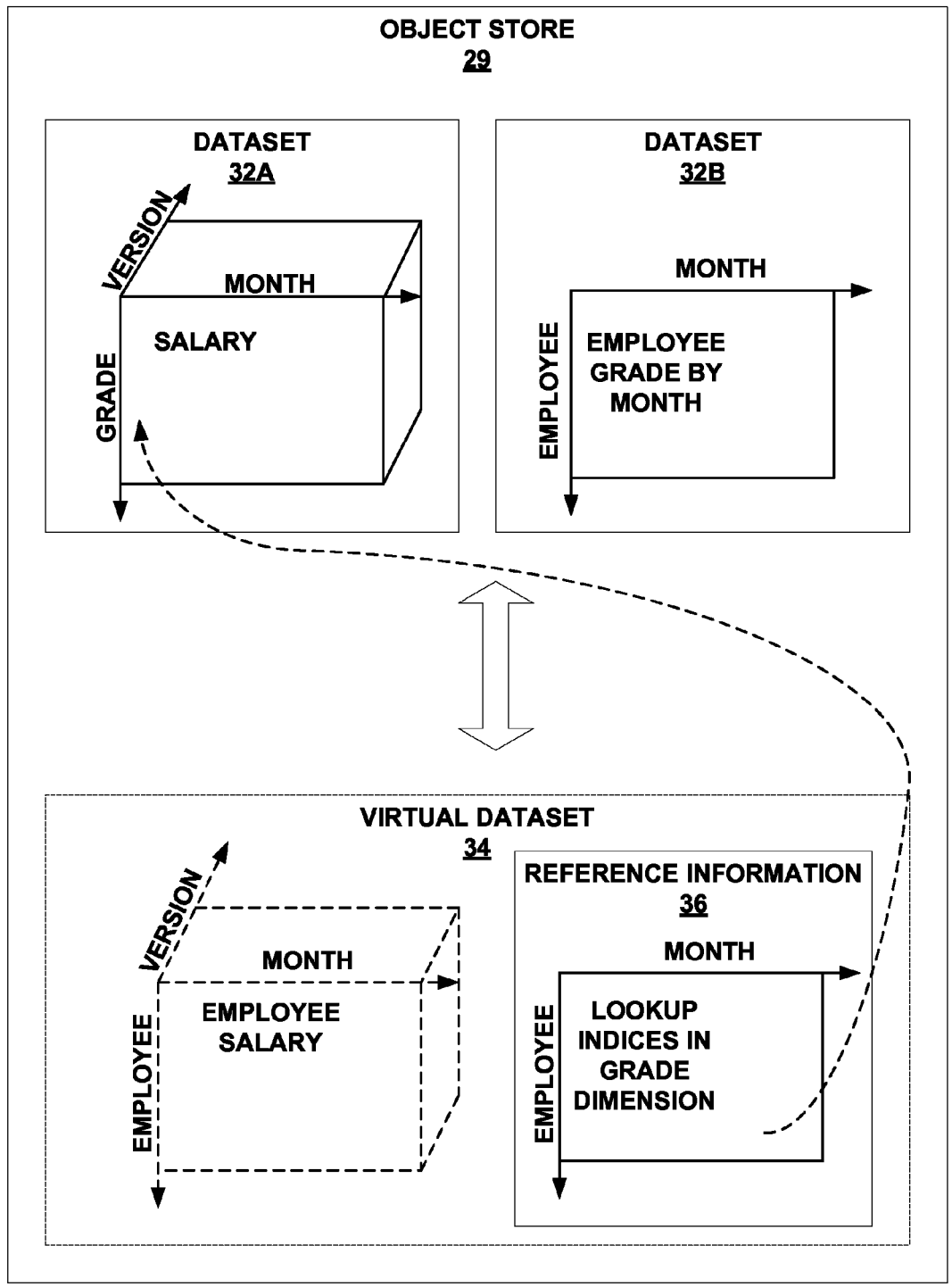
FIG. 3 is a block diagram illustrating an exemplary embodiment of an object store of FIG. 2.

FIG. 3 is a block diagram illustrating an exemplary embodiment of object store 30 of FIG. 2. As illustrated in FIG. 3, object store 30 comprises instantiations of object model 28, herein shown as datasets 32A, 32B and virtual dataset 34, where object model 28 creates virtual dataset 34 as a result of a selection operation, as described above. Although illustrated with only two datasets 32A, 32B and one virtual dataset 34, object model 28 may comprise any number of datasets and virtual datasets, and the principles of the invention should not be limited as such.

Datasets 32A, named "Salary," includes a salary object referencing grade, version, and month dimensions, as represented by the three arrowed lines of the cube. Dataset 32B, named "EmployeeGradeByMonth," includes a grade object referencing employee and month dimensions, as represented by the two arrowed lines of the square. Virtual dataset 34, named "EmployeeSalary," includes a salary object referencing employee, month and version dimensions, as represented by the three dashed arrowed lines of the dashed-lined cube. Virtual dataset 34 also includes reference information 36 that specifies lookup indices in the grade dimension of dataset 32A, as indicated by the dashed line from reference information 36 to dataset 32A. Reference information 36 represents lookup indices object that, when resolved, contains indices to employee and month dimensions.

In the example illustration of FIG. 3, object model 28 has resolved virtual dataset 34 and, therefore, computed the necessary indices and stored these indices to reference information 36 as reflected by the above mentioned dashed line to dataset 32A. Object model 28 typically provides on-demand resolution, or only resolves reference information 36, i.e., computes the indices and accesses dataset 32A, when requested or demanded by one of planning applications 25. Thus, when one of planning applications 25 invokes the API to create virtual dataset 34, object model 28 defines virtual dataset 34 as a cube (shown in dashed form) having the proper dimensionality depending on the particular operation being applied without allocating space to store multidimensional data from the underlying dataset 32A and, optionally, without computing and storing the indices necessary to retrieve the multidimensional data.

In this example, object model 28 creates virtual dataset 34 in response to a selection operation issued by one of planning applications 25 specifying dataset 32A in the <Source> field, dataset 32B in the <Selector> field, and virtual dataset 34 in the <Result> field of the ".select( )" method, as follows:

EmployeeSalary=Salary.Select(EmployeeGradeBy-Month)

The resulting EmployeeSalary virtual dataset 34 only stores the specified selectors and the dimensions of the virtual cube along with the indices stored in reference information 36 that were generated upon resolving the virtual data set when demanded by one of the planning applications. Notably, object model 28 stores the indices in a two dimension square even though the indices reference the three dimensional data cube of dataset 32A. Because the indices may require less storage space than the underlying data objects and only two dimensions need be stored rather than three, virtual dataset 32 may require less storage space than a corresponding dataset.

Figure 4:
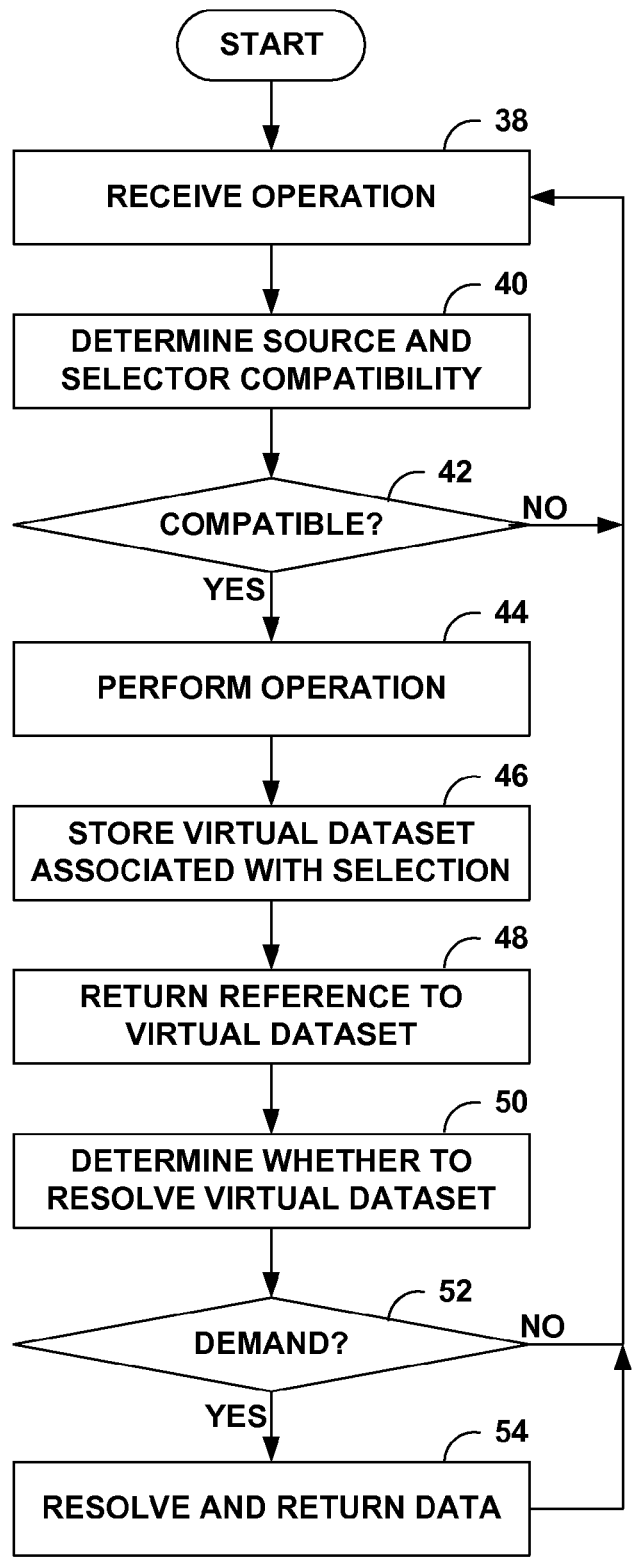
FIG. 4 is a flowchart illustrating exemplary operation of a computing device that provides a consistent and flexible object model interface by which planning applications executing within the computing device may specify or select virtual datasets from datasets stored locally within the computing device.

FIG. 4 is a flowchart illustrating exemplary operation of a computing device, such as computing device 16A of FIG. 2, that provides a consistent and flexible object model interface by which planning applications executing within computing device 16A may specify virtual datasets from datasets stored locally within computing device 16A. While described in reference to computing device 16A of FIG. 2, the principles of the invention may apply in other contexts, such as within an enterprise planning system. For example, the enterprise planning system, such as enterprise planning session of FIG. 2, may include an object model and object model interface, similar to object model 28 and object model interface 26, and planning applications 25 may interact with the object model interface within enterprise planning system 14 to remotely perform the selection operation described herein.

Initially, API 27 of object model interface 26 receives an operation in accordance with a predefined syntax, such as that described above in reference to the selection operation, from planning applications 25 (38). Planning applications 25, for example, may specify the <Result>, <Source>, and <Selector> fields, as described above. Upon receiving the operation, API 27 verifies the syntax and forwards the operation to object model 28, which may determine the compatibility of the specified source and selector datasets, as per the selection operation discussed above (40). Object model 28 may only determine compatibility if two or more selector datasets are specified, as described above. If two or more are specified, object model 28 may, for example, access the datasets specified in the <Selector> field, which may comprise one of datasets 32 or virtual datasets 34 stored within object store 30, in order to determine whether they are compatible, as described above. API 27 may search the dimensions of each <Selector> dataset to determine whether each <Selector> dataset references a different dimension of the <Source> dataset. Referring to the example, if no two <Selector> datasets reference the same dimension of the <Source> dataset, the <Selector> and <Source> datasets are compatible, and object model 28 may perform the specified selection operation ("YES" 42). However, if two or more <Selector> datasets reference the same dimension of the <Source> dataset, the datasets are incompatible, and object model 28 rejects the selection operation and waits for another selection operation ("NO" 42, 38).

Assuming that the operation specifies compatible datasets if required, object model 28 performs the operation (44). Object model 28 may, for example, execute the above described selection operation by mapping the dataset(s) specified by the <Selector> field onto the compatible dimensions defined in the <Source> dataset. After performing this mapping, object model 28 stores the result of the mapping to a newly created virtual dataset, such as virtual dataset 34 of FIG. 3 (46). As illustrated in FIG. 3, virtual dataset 34 includes reference information 36, which object model 28 creates initially as a placeholder in the eventuality that object model 28 resolves virtual dataset 34. After storing virtual dataset 34, object model 28 returns a reference or handle back to the newly created virtual dataset 34 that stores the result of the selection operation (48).

In some embodiments, the API of object model interface 36 or some other component may indicate whether object model 28 should resolve virtual dataset 34. In other embodiments, object model 28 may only resolve virtual dataset 34 on demand, meaning that object model 36 only resolves virtual dataset 34 when planning applications 25 specifically request access via API 27 to items indicated by indices stored in reference information 36, for example. In this embodiment, a selection operation, for example, may never require object model 28 to resolve virtual dataset 34 because a selection operation does not constitute a request operation. On-demand resolution may decrease the computational steps necessary to perform a selection operation and therefore possibly reduce the time necessary to perform the selection operation.

Assuming an embodiment offering on-demand resolution of virtual dataset 34, object model 28 may not initially resolve virtual dataset 34 and therefore no determination of whether to resolve virtual dataset 34 is necessary (50). However, in some embodiments, object model 28 may offer on-demand resolution and subsequently receive a request for virtual dataset 34. Assuming this instance for purposes of illustration, object model 28 determines to resolve virtual dataset 34 based on this demand, resolves virtual dataset 34 by computing and storing the reference to the underlying items of dataset 32A in reference information 36, for example, and returns the underlying items referenced by virtual dataset 34 in order to satisfy the demand (50, "YES" 52, 54). However, if no demand for virtual dataset 34 follows, object model 28 need not resolve virtual dataset 34 ("NO" 52). In either instance, object model 28 continues to wait for subsequent operations (38).

Figure 5A:
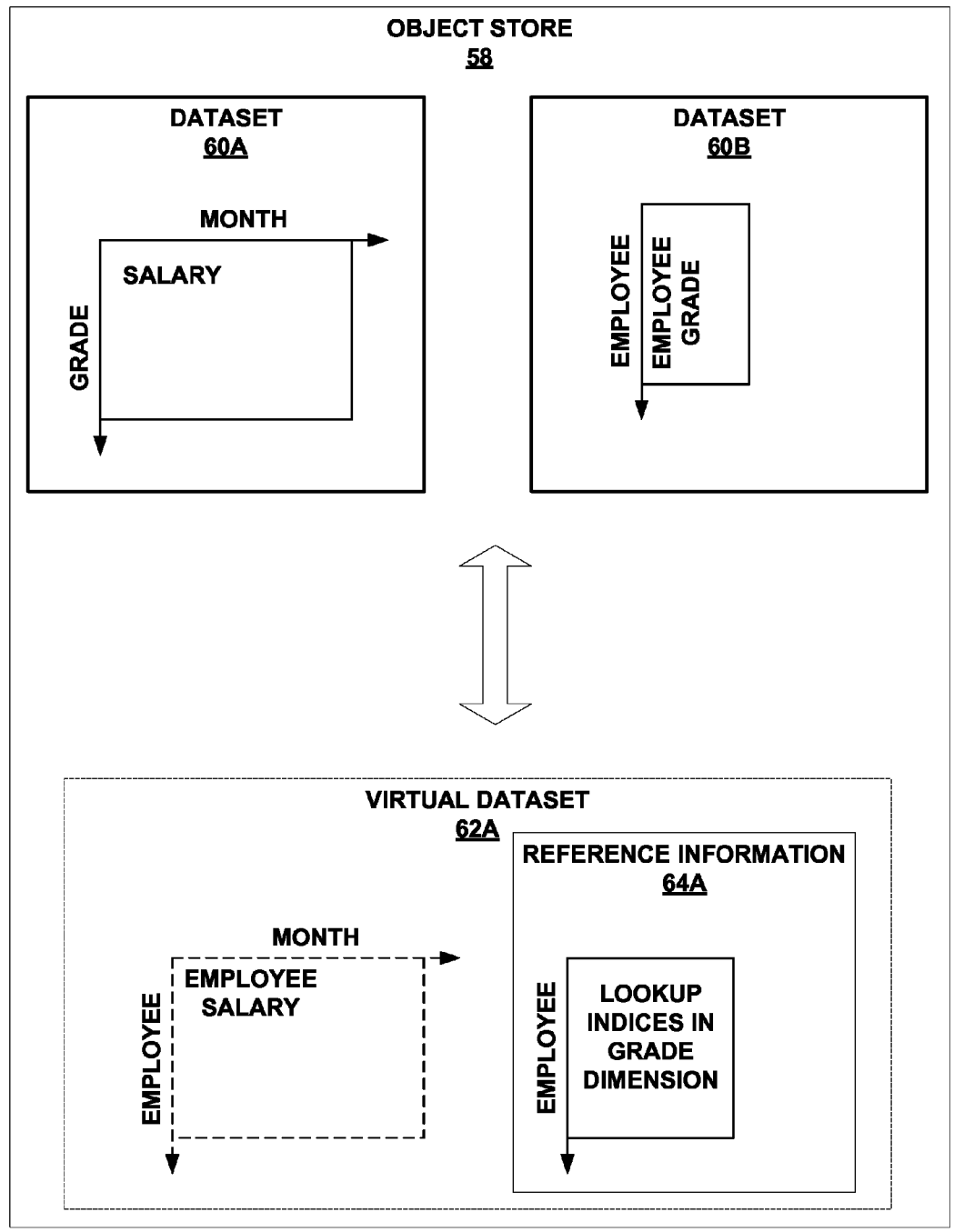
FIGS. 5A-5C are block diagrams illustrating an object store that stores the result of successive selection operations, or a single layered selection operation, issued by planning applications to an object model via an object model interface.
Figure 5B:
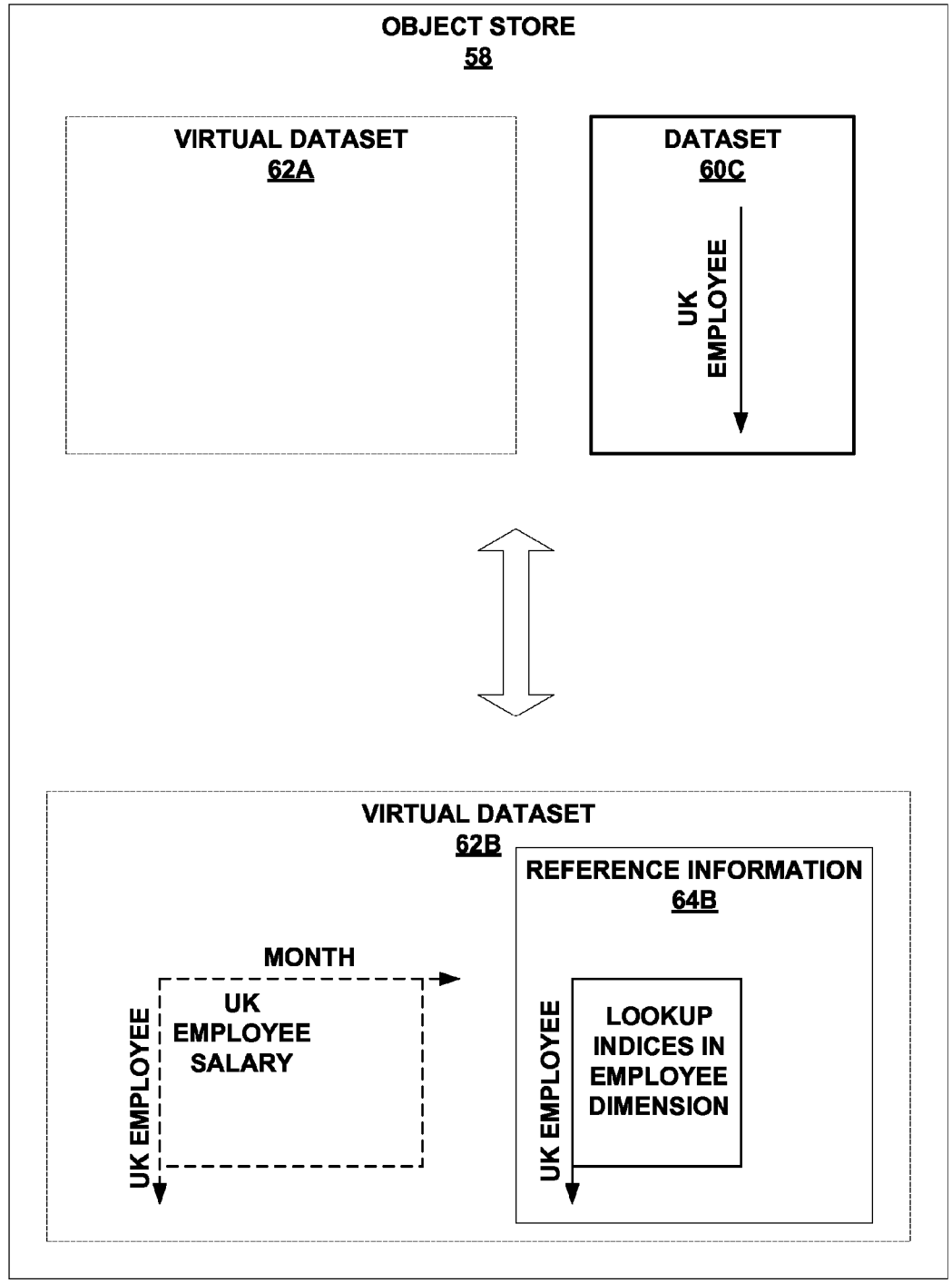
Figure 5C:
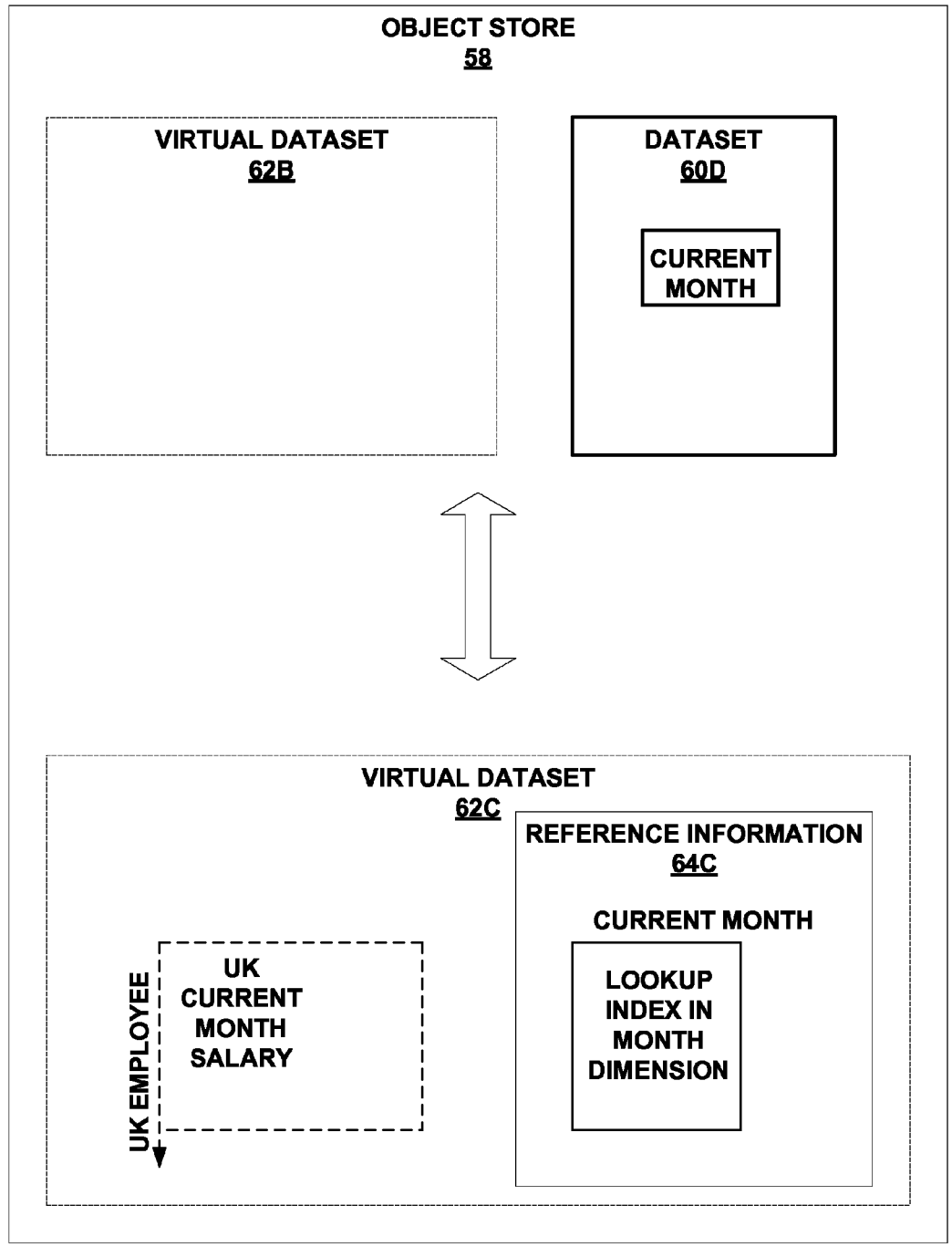

FIGS. 5A-5C are block diagrams illustrating an object store 58 that stores the result of successive selection operations, or a single layered selection operation, issued by planning applications, such as planning operations 25 of FIG. 2, to an object model, such as object model 28, via an object model interface 26. Object store 58 may be substantially similar to object store 29 of FIG. 2, in that object store 58 may store virtual datasets that merely reference datasets without storing any of the underlying items of the referenced dataset.

As illustrated in FIGS. 5A-5C, object store 58 stores datasets 60A-60D ("datasets 60") and virtual datasets 62A-62C ("virtual datasets 62"). Object model 28 stores each of virtual datasets 62 after receiving an appropriate .select( ) operation from API 27 of object model interface 26. Planning applications 25 may invoke the .select( ) operation via the API in the following sequence:

EmployeeSalary=Salary.Select(EmployeeGrade)

UKEmployeeSalary=EmployeeSalary.Select (UKEmployee)

UKCurrentMonthSalary=UKEmployeeSalary.Select (CurrentMonth)

This sequence reflects a successive invocation of the .select( ) method. Other ways of performing the first two .select( )

methods of the above sequence may include a layered approach, such as the following:

UKEmployeeSalary=(Salary.Select(Employee Grade)).Select(UKEmployee)

or

UKEmployeeSalary=Salary.Select(Employee Grade.Select(UKEmployee))

Finally, the following more complex multi-dimensional layered approach may reach the same result as the three step sequence above:

UKCurrentMonthSalary=EmployeeSalary.Select (UKEmployee, CurrentMonth)

All of the above, demonstrate the flexibility that API 27 of object model interface 26 may provide to planning applications 25 in invoking various .select( ) methods. For ease of illustration, only the first sequence is discussed below.

Referring to FIG. 5A, object store 58 initially stores datasets 60A, 60B. Dataset 60A, identified by the name "Salary," is an object of type salary that references grade and month dimensions. Dataset 60B, identified by the name "EmployeeGrade," is an object of type grade that references an employee dimension. Planning applications 25 via object model interface 26 issues the following .select( ) operation, which is the first selection operation of the above sequence, to object model 58:

EmployeeSalary=Salary.Select(EmployeeGrade)

Because only one <Selector> dataset 60B, identified as "EmployeeGrade," operates on the <Source> dataset 60A, identified as "Salary," object model 28 need not determine compatibility, as described above. Thus, object model 28 performs the mapping of <Selector> dataset 60B onto <Source> dataset 60A yielding <Result> virtual dataset 62A, which object model 28 creates within object store 58 to store the result of the .select( ) operation.

Virtual dataset 62A, identified by the name "EmployeeSalary," is a virtual object referencing dimensions employee and month that store virtual elements of type salary, as the <Result> object must always store elements of the same type as the <Source> object. Virtual dataset 62A references these dimensions because object model 28 translates the grade dimension of <Source> dataset 60A onto the employee dimension of <Selector> dataset 60B yielding the employee dimension defined by <Result> virtual dataset 62A.

Virtual dataset 62A also includes reference information 64A that may store lookup indices in the grade dimension of <Source> dataset 60A, but only in the event object model 28 resolves virtual dataset 62A, as described above. If object model 28 receives no demand from planning applications 25, object model 28 creates reference information 64A, as a placeholder. Thus, reference information 64A includes the text "lookup indices in grade dimension" only to suggest that object model 28 may store lookup indices to reference information 64A. Once object model 28 finishes creating virtual dataset 62A, it may await further .select( ) operations.

In this example, object model 28 receives the following next .select( ) operation in the above sequence of operations:

UKEmployeeSalary=EmployeeSalary.Select (UKEmployee)

Referring to FIG. 5B, object store 58 now includes virtual dataset 62A, identified by the name "EmployeeSalary," from the previous .select( ) operation in the sequence. This second .select( ) operation references virtual dataset 62A via its name "EmployeeSalary" and utilizes it in the <Source> field without first resolving virtual dataset 62A, as illustrated in FIG. 5B by dashed box, which indicates that it remains unresolved. The .select( ) operation also references dataset 60C via its name "UKEmployee" and utilizes it in the <Selector> field. Dataset 60C is shown in FIG. 5B as a single arrow, which indicates that it is an identity dataset. The value for each cell in the identity dataset is the corresponding member of the single dimension.

Object model 28 receives this second .select( ) operation via the API of object model interface 26 from planning applications 25. Any one of planning applications 25 may have issued this second .selection operation, and the same planning application 25 need not issue all of the .select( ) operations in the sequence. Object model 28 again need not determine the compatibility between now <Source> virtual dataset 62A and dataset 60C for the reasons described above. Object model 28 first builds virtual dataset 62B by building a virtual object that references UK employee and month dimensions and stores virtual elements of type salary. Virtual dataset 62B is identified by the name specified in the result field, i.e., "UKEmployeeSalary." Next, object model 28 creates reference information 64B as a placeholder, where the text "lookup indices in employee dimension" only suggests that object model 28 may resolve and store the lookup indices in the employee dimension of virtual dataset 62A. Reference information 64B may refer to the underlying location of items within virtual dataset 62A, which themselves may refer back to items within dataset 60A. In particular, reference information 64B includes lookup indices in the employee dimension of virtual dataset 62A. Once object model 28 finishes building virtual dataset 62B, it may await further .select( ) operations.

In this example, object model 28 receives the following final .select( ) operation in the above sequence of operations:

UKCurrentMonthSalary=UKEmployeeSalary.Select (CurrentMonth)

Referring to FIG. 5C, object store 58 now includes virtual dataset 62B, identified by the name "UKEmployeeSalary," from the previous .select( ) operation in the sequence. This third.select( ) operation references virtual dataset 62B via its name "UKEmployeeSalary" and utilizes it in the <Source> field without first resolving virtual dataset 62B, as illustrated in FIG. 5C by the dashed box which indicates that it remains unresolved. The .select( ) operation also references dataset 60D via its name "CurrentMonth" and utilizes it in the <Selector> field. Dataset 60D is shown in FIG. 5B as a single square box, which indicates that it is a zero-dimensional dataset. A zero-dimensional dataset is another way of referring to a single scalar value with no dimensions.

Object model 28 receives this third .select( ) operation via API 27 of object model interface 26 from planning applications 25. Any one of planning applications 25 may have issued this third selection operation, and the same planning application 25 need not issue all of the .select( ) operations in the sequence. Object model 28 need not determine the compatibility between now <Source> virtual dataset 62B and dataset 60D for the reasons described above. Thus, object model 28 performs the third .select( ) operation.

Object model 28 first builds virtual dataset 62C by building a virtual object that references UK employee dimension, removing the current month dimension, and storing a series of virtual elements of type salary. This provides a generic mechanism for removing specified dimension from a data set. Virtual dataset 62C is identified by the name specified in the result field, i.e., "UKCurrentMonthSalary." Next, object model 28 creates reference information 64C as a placeholder, unless a subsequent demand requests items referenced by virtual dataset 62C. If resolved, reference information 64C refers to the underlying location of items within virtual dataset 62B, i.e., lookup indices, which themselves may refer back to items within virtual dataset 62A, i.e., further lookup indices that refer back to items within dataset 60A. In particular, reference information 64C may include a lookup index in month dimension of virtual dataset 62B. Once object model 28 finishes building virtual dataset 62C, it may await further .select( ) operations or other operations that require object model 28 to resolve any one of virtual datasets 62.

Although described as referring back to one another, e.g., reference information 64C refers back to virtual dataset 62B, the techniques described herein may allow each of reference information 64A-64C to refer directly to the underlying items stored, for example, by dataset 60A. In these embodiments, object model 28 may compute the lookup indices of each of reference information 64A-64C independently, such that demand for reference information 64C, for example, does not require object model 28 to re-resolve reference information 64B. In other words, having once resolved reference information 64B, new reference information 64C is generated when needed to enable data values to be retrieved directly from the source dataset without repeated reference through reference information 64B. This technique allows enterprise system 4 to more quickly compute, store, and return items referenced by reference information 64C, for example.

Although described above in reference to a sequence of .select( ) operations, object model 28 may perform layered .select( ) operations, as well as, complex layered .select( ) operations, such as those mentioned above. In performing these operations, object model 28 may follow typical syntactical rules pertaining to common programming languages. For example, object model 28 will perform the following operation:

UKEmployeeSalary=Salary.Select(Employee
Grade.Select(UKEmployee))

by unwrapping the various .select( ) operations as follows:

Temp=EmployeeGrade.Select(UKEmployee)

UKEmployeeSalary=Salary.Select(Temp)

Thus, the API of object model interface 26 provides flexible layering of .select( ) operations by breaking the layered and complex-layered .select( ) operations into discreet .select( ) operations.

Figure 6:
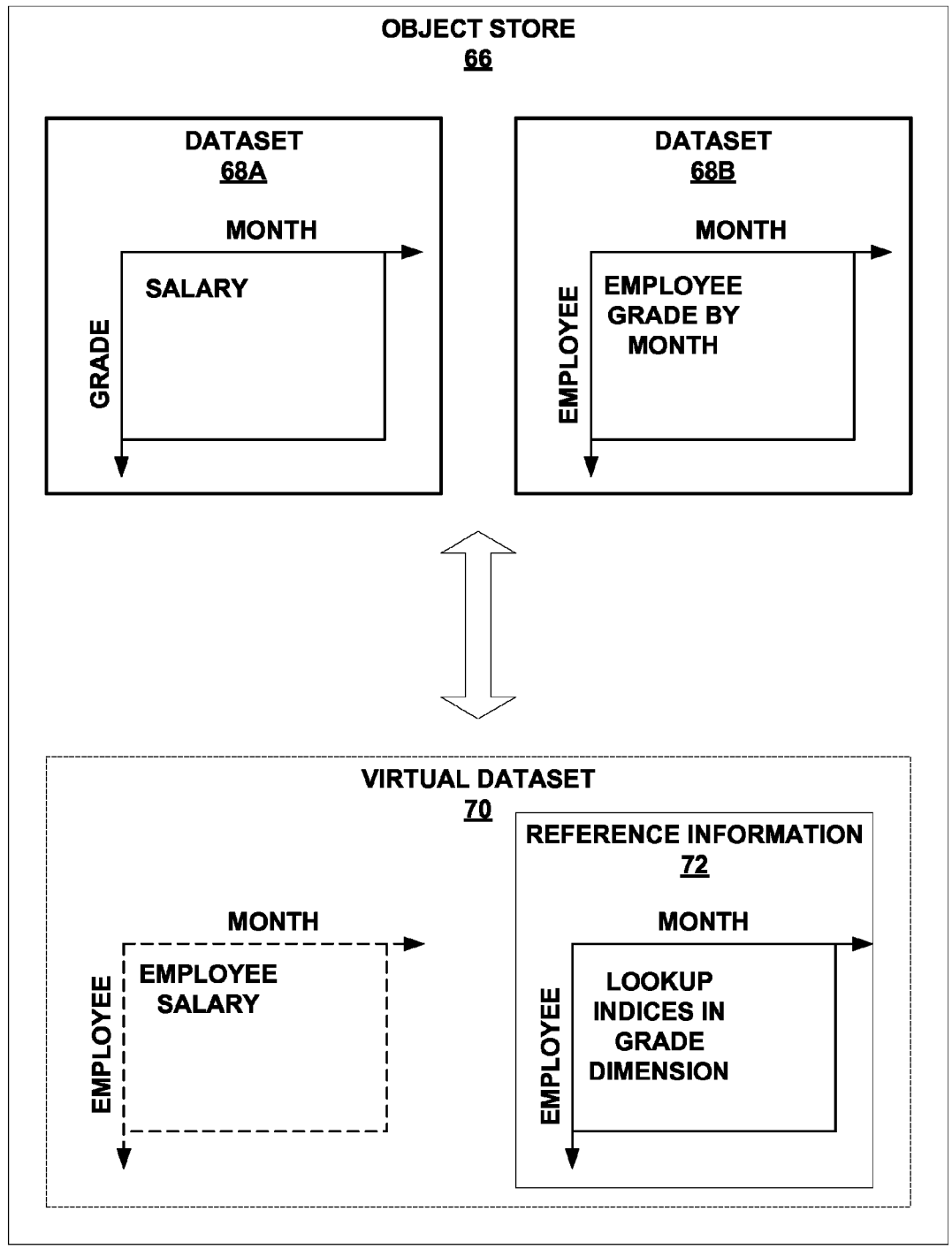
FIG. 6 is a block diagram illustrating another exemplary object store that stores the result of a selection operation, wherein the <Selector> field specifies a multi-dimensional dataset.

FIG. 6 is a block diagram illustrating another exemplary object store 66 that stores the result of a selection operation, wherein the <Selector> field specifies a multi-dimensional dataset. Object store 66 may be substantially similar to object store 58 of FIGS. 5A-5C; however, unlike object store 58 that stored <Selector> datasets 60B-60C having a single-dimension, or no dimensions at all, i.e., a scalar values, object store 66 stores a multi-dimensional <Selector> dataset.

As shown in FIG. 6, object store 66 stores a dataset 68A, dataset 68B, and a virtual dataset 70. Initially, object store 66 only stores datasets 68A, 68B until an object model, such as object model 28 of FIG. 2, receives a .select( ) operation, which may cause object model 28 to build virtual dataset 70. Planning applications 25 invoke the following .select( ) operation via API 27 of object model interface 26 in order to cause object model 28 to build virtual dataset 70:

EmployeeSalary=Salary.Select(EmployeeGradeBy-
Month)

Planning applications 25 specify dataset 68A by its name "Salary" in the <Source> field, dataset 68B by its name "EmployeeGradeByMonth" in the <Selector> field, and a new virtual dataset 70 by its name "EmployeeSalary" in the <Result> field. Dataset 68A comprises an object of type salary that references grade and month dimensions. Dataset 68B comprises an object of type grade that references employee and month dimensions. Virtual dataset 70 comprises an object of type salary that references employee and month dimensions.

Upon receiving this .select( ) operation, or selection operation, object model 28 proceeds to perform the .select( ) operation in the manner discussed above. Object model 28 stores a reference to the result of the .select( ) operation to reference information 72 included within virtual dataset 70. Reference information 72 may include lookup indices in the grade dimension of dataset 68A if resolved; otherwise, it remains as a placeholder for future storage of lookup indices. Because dataset 68B, i.e., the dataset specified in the <Selector> field, comprises a multi-dimensional dataset, this allows for employees to change grade and for the relevant salary to be selected according to the grade in a given month. Although virtual dataset 70 appears similar to virtual dataset 62A of FIG. 5A, virtual dataset 70 takes into account grade changes, unlike virtual dataset 62A.

Figure 7:
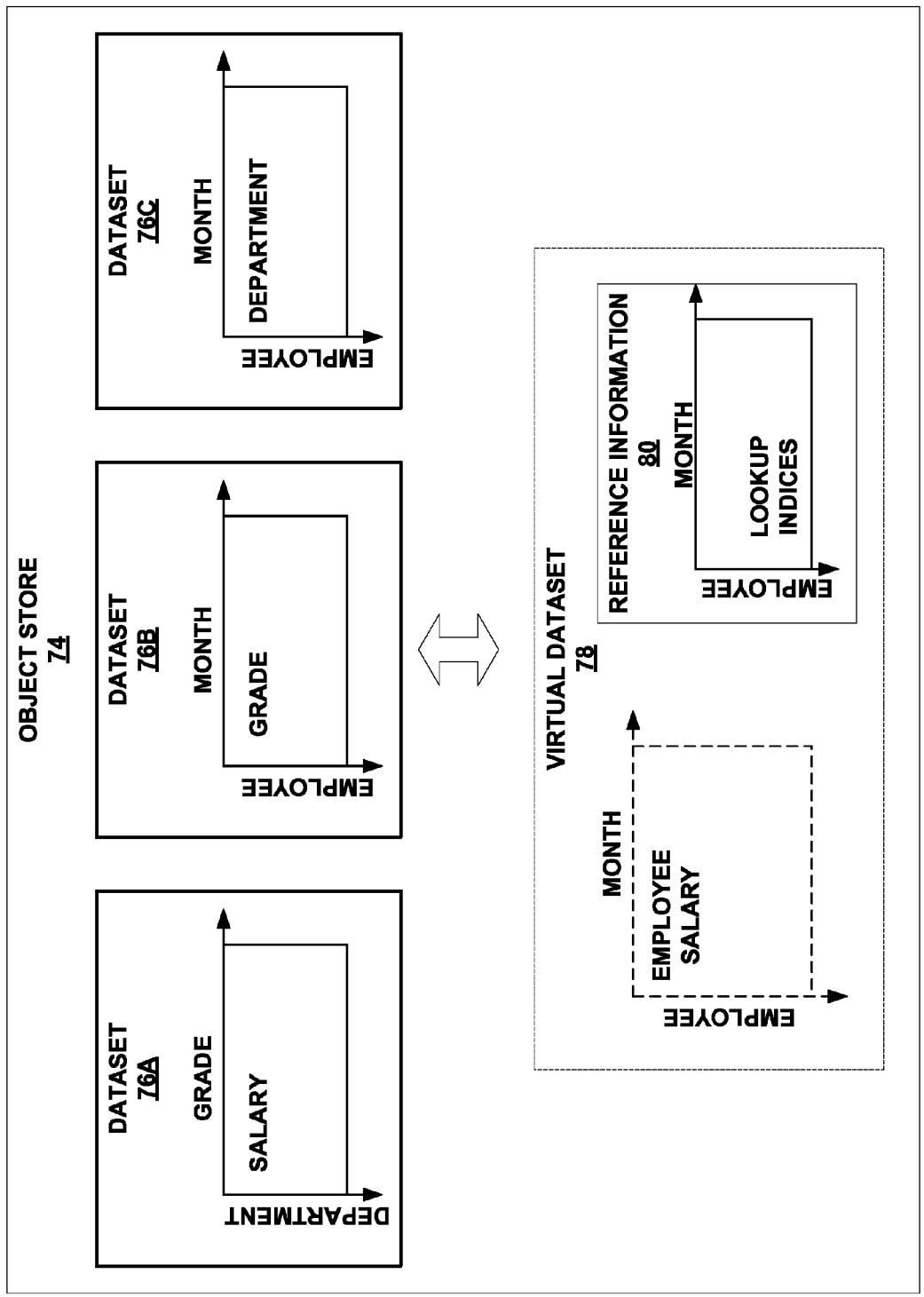
FIG. 7 is a block diagram illustrating another exemplary object store that stores the result of a dataset projection.

FIG. 7 is a block diagram illustrating another exemplary object store 74 that stores the result of a dataset projection. Object store 74 may be substantially similar to object store 30 of FIG. 2.

As shown in FIG. 7, object store 74 stores a datasets 76A-76C and a virtual dataset 78. Initially, object store 74 only stores datasets 76A-76C until an object model, such as object model 28 of FIG. 2, receives a .select( ) operation, which may cause object model 28 to build virtual dataset 78. Planning applications 25 invoke the following .select( ) operation via API 27 of object model interface 26 in order to cause object model 28 to perform the dataset projection, storing the result to virtual dataset 70:

EmployeeSalary=Salary.Select(Grade, Department).

Planning applications 25 specify dataset 76A by its name "Salary" in the <Source> field, dataset 76B by its name "Grade" in the first <Selector> field, dataset 76C by its name "Department" in the second <Selector> field, and a new virtual dataset 70 by its name "EmployeeSalary" in the <Result> field. Dataset 76A comprises an object of type salary that references grade and department dimensions. Dataset 76B comprises an object of type grade that references employee and month dimensions. Dataset 76C Virtual dataset 70 comprises an object of type salary that references employee and month dimensions. The above selection operation enables planning applications 25 to perform a dataset projection where employee salaries are projected from the dataset specified in the <Source> field, or dataset 76A, onto the dimensions specified by the datasets specified in the <Selector> field, or datasets 76B, 76C. If dataset 76A is changed, virtual dataset 78 updates automatically. If selector datasets 76B or 76C are changed, such as an employee changing grade within dataset 76B, reference information 80 is re-resolved.

Upon receiving this .select( ) operation, or selection operation, object model 28 first determines whether the two datasets are compatible, in the manner described above. Here, datasets 76A-76C are compatible, and object model 28 proceeds to perform the .select( ) operation, also in the manner discussed above. Object model 28 stores a reference to the result of the .select( ) operation to reference information 80 included within virtual dataset 78. Reference information 80 includes lookup indices that reference dataset 76A based on the two selector datasets, i.e., datasets 76B, 76C, once resolved; otherwise, reference information 80 acts as a placeholder until resolved. Because virtual dataset 78 remains virtual, or unresolved, changes to datasets 76A-76C automatically update virtual dataset 78. Thus, should an employee change grade within dataset 76B, for example, object model 28 need not make changes to virtual dataset 78, as virtual dataset 78 merely stores a reference to datasets 76A-76C. In this manner, object model 28 may perform dataset projection to scatter-point-select individual values from dataset 76A.

Figure 8:
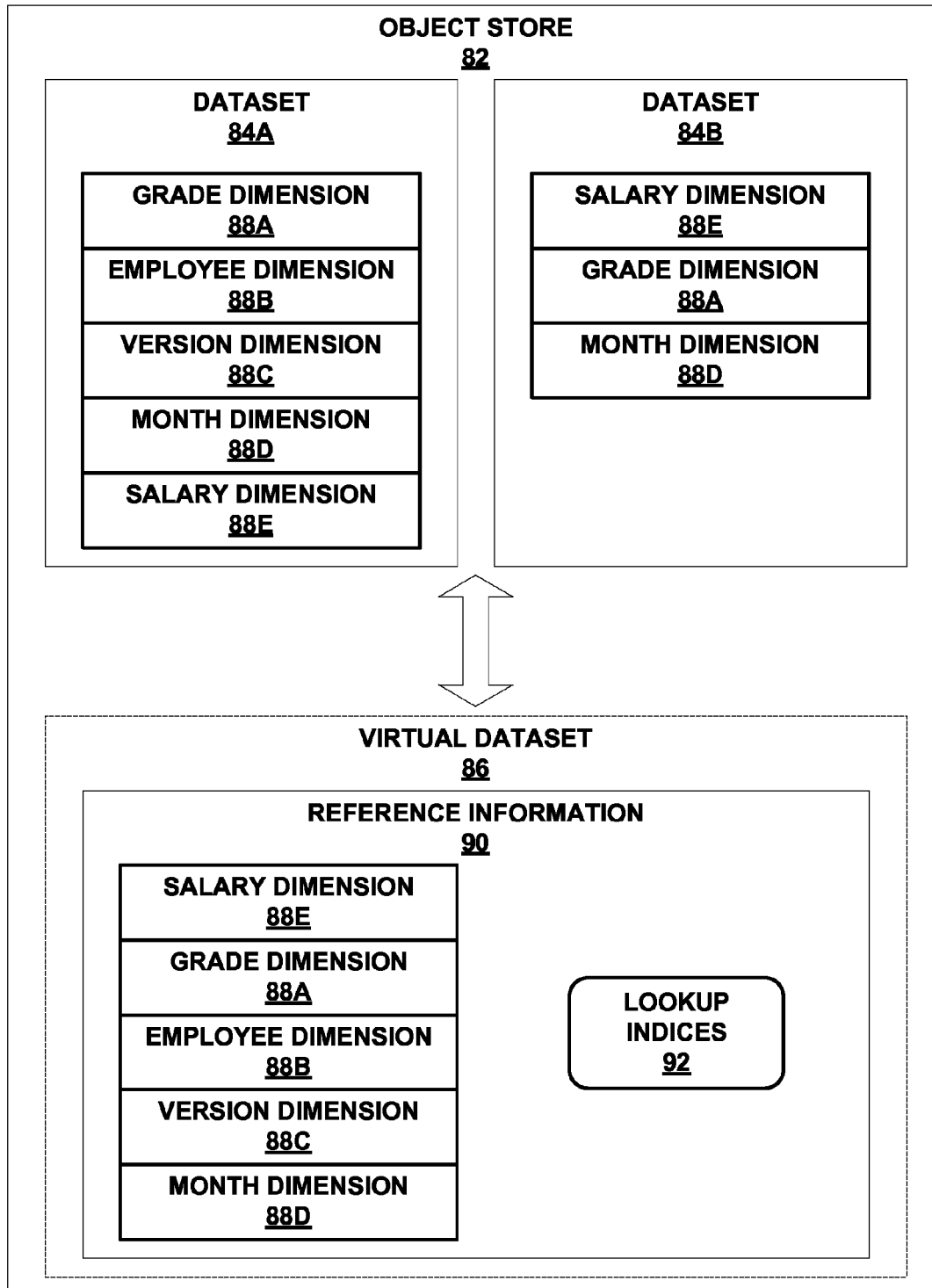
FIG. 8 is a block diagram illustrating another exemplary object store that stores the result of another exemplary selection operation.

FIG. 8 is a block diagram illustrating another exemplary object store 82 that stores the result of another exemplary selection operation. Object store 82 may be substantially similar to object store 30 of FIG. 2.

As shown in FIG. 8, object store 82 stores a dataset 84A, a dataset 84B, and a virtual dataset 86. Initially, object store 82 only stores datasets 84A, 84B until an object model, such as object model 28 of FIG. 2, receives a .select( ) operation, via API 27, which may cause object model 28 to build virtual dataset 86. Planning applications 25 invoke a .select( ) operation, similar to those described above, via API 27 in order to cause object model 28 to build virtual dataset 86. Planning applications 25 specify dataset 84A by its name in the <Source> field, dataset 84B by its name in the <Selector> field, and a new virtual dataset 86 by its name in the <Result> field, similar to the selection operations described above.

Dataset 84A comprises an object that references respective grade, employee, version, month, and salary category dimensions 88A-88E in that particular order. Dataset 84B comprises an object that references respective salary category, grade, and month dimensions 88E, 88A, 88D also in that particular order. Virtual dataset 86 comprises an object having reference information 90 that references respective salary category, grade, employee, version, and month dimensions 88E, 88A, 88B, 88C, 88D in that particular order and includes lookup indices 92 if resolved; otherwise, lookup indices 92 act as a placeholder until resolved by object module 28. Because multi-dimensional object having more than three dimensions are difficult to illustrate, a dimensional view or cube illustration is not shown in FIG. 8 contrary to the illustrations of previous FIGS. 5, 6, 7.

Upon receiving this selection operation, object model 28 first determines whether the two datasets are compatible, in the manner described above. Here, datasets 84A, 84B are compatible, and object model 28 proceeds to perform the selection operation, also in the manner discussed above. Object model 28 stores a reference to the result of the selection operation to reference information 90 included within virtual dataset 86. Reference information 90 includes lookup indices 92 in one of dimensions 88A-88E once resolved, also as described above. Notably, the selection operation ensures that reference information 90 references dimensions 88A-88E in a particular order.

Specifically, the selection operation ensures that the respective order of salary, grade, and month dimensions 88E, 88A, 88D of dataset 84B carries through to reference information 90. Reference information 90, as illustrated in FIG. 8, reflects this adherence to respective order by ordering salary dimension 88E first, followed by grade dimension 88A, and ending with month dimension 88D. This order is "respective" in that dimensions 88B, 88D, which are not referenced by dataset 84B, may be interspersed within this ordering. Because object model 28, while creating reference information 90, must reorder salary dimension 88E, but not any other of dimensions 88A-88D, to adhere to the respective ordering of dimensions 88E, 88A, 88D of dataset 84B, it reorders only those dimensions 88A-88E that require reordering so as to limit the complexity, thereby possibly saving time. Moreover, consistent ordering enables users to quickly determine the ordering of referenced dimensions 88A-88E within virtual dataset 86. In one embodiment, use of the selection mechanism to reorder the dimensions of source dataset 84A utilizes three individual selector datasets, instead of one selector database 84B in this example. In this case, a 1-dimensional selector dataset is used for each of the dimensions that are having their order specified, similar to the identity dataset 60C of FIG. 5B, but in this case containing the full source dimension rather than a subset.

Generally, the selection operation may operate according to three ordering rules. First, the selection operation honors the order of the dimensions of the dataset specified in the <Selector> field, or the order of dimensions 88E, 88A, 88D of dataset 84B. Second, new dimensions, or dimensions not present in the dataset specified <Source> field, are introduced as early in the sequence as permitted by the first rule. Third, the dimension order of the resultant virtual dataset is kept as close to the dimension order of the dataset specified in the <Source> field as permitted by the first and second rules. To further elaborate upon these rules, the following notation may be helpful:

Let X {v} [a, b] mean dataset X with dimensions a and b and values from v, where the values may possibly be members of a dimension themselves.

Utilizing this notation to express an instance where object model 28 replaces an existing dimension with another dimension and inserts this other dimension at the position of the replaced dimension, the following results:

Source{v}[a, b].select(Selector{a}[q, r])→Selection{v}[q, r, b].

Here, object model 28 performs a selection operation upon a source dataset with dimension a and b and values from v with a selector dataset with dimensions q and r and values from a. Object model 28 creates a new virtual dataset similar to virtual dataset 86 with dimensions q, r, and b and referencing values v from the original source dataset. As shown via the notation, object model 28 honors the respective order of the dimensions of the selector dataset according to the first rule in the selection dataset.

Utilizing this notation again to express an instance where object model 28 performs a selection operation having a dimension b, or a one-dimensional dataset, in the argument list of the selection operation, the following same selection dataset as above results:

Source{v}[a, b].select(Selector{a}[q, r], b{b} [b])→Selection{v}[q, r, b]

According to the above notation, object model 28 performs a selection operation upon a source dataset with dimension a and b and values from v with both a selector dataset with dimension q and r and values from a and a 'b' dataset with dimension b and values from b. Object model 28 creates a new virtual dataset similar to virtual dataset 86 with dimensions q, r, and b and referencing values v from the source dataset.

Further use of the notation may further exemplify the first rule, as follows:

Source{v}[a, b].select(b{b}[b], Selector{a}[q, r])→Selection{v}[b, q, r]

where contrary to the preceding example, the 'b' dataset comes before the selector dataset in the ".select( )" argument list. Object model 28 creates a new virtual dataset similar to virtual dataset 86, but in this instance, arranges the b dimension before the q and r dimensions due to the switch of the 'b' and selector dataset ordering in the ".select( )" argument list.

To express with the above notation that object model 28 inserts new dimensions, or dimensions introduced by the selector dataset and not found in the source dataset, as early as possible, the following results:

Source{v}[a, b].select(Selector{x}[q, r])→Selection{v}[q, r, a, b].

Here, object model 28 performs a selection operation upon a source dataset with dimensions a and b and values from v with a selector dataset with dimension q and r and values from x. Object model 28 creates a new virtual dataset similar to virtual dataset 86 with dimensions q, r, a, and b and referencing values v from the source dataset.

The notation may also be used to express instances where a disagreement in the dimension order between arguments in the selection operation exist and what object model 28 generates as a result:

Source{v}[a, b].select(Selector1{a}[q, r], Selector2{b}[r, q])→Selection{v}[q, r].

Here, object model 28 performs a selection operation upon a source dataset with dimensions a and b and values from v with both a first selector dataset and a second selector dataset. The notation expresses the disagreement in that the first selector dataset has dimensions q and r and the second selector dataset has dimensions r and q, both in that order. Object model 28 resolves the disagreement by honoring the dimension ordering of the first selector dataset, thus creating a new virtual dataset similar to virtual dataset 86 with dimensions q and r in that order.

The notation may also express that object model 28 may transpose a source dataset, as follows:

Source{v}[a, b, c].select(c{c}[c], b{b}[b], a{a}[a])→Selection{v}[c, b, a].

Here, object model 28 performs a selection operation upon the source dataset with dimensions a, b, and c and values from v with three single dimension datasets, 'a,' 'b,' and 'c.' Object model 28 creates a new virtual dataset similar to virtual dataset 86 by transposing the ordering of the dimensions of the source dataset.

All of the above illustrate that the selection operation provides a flexible and consistent approach to specify virtual datasets.

Figure 9A:
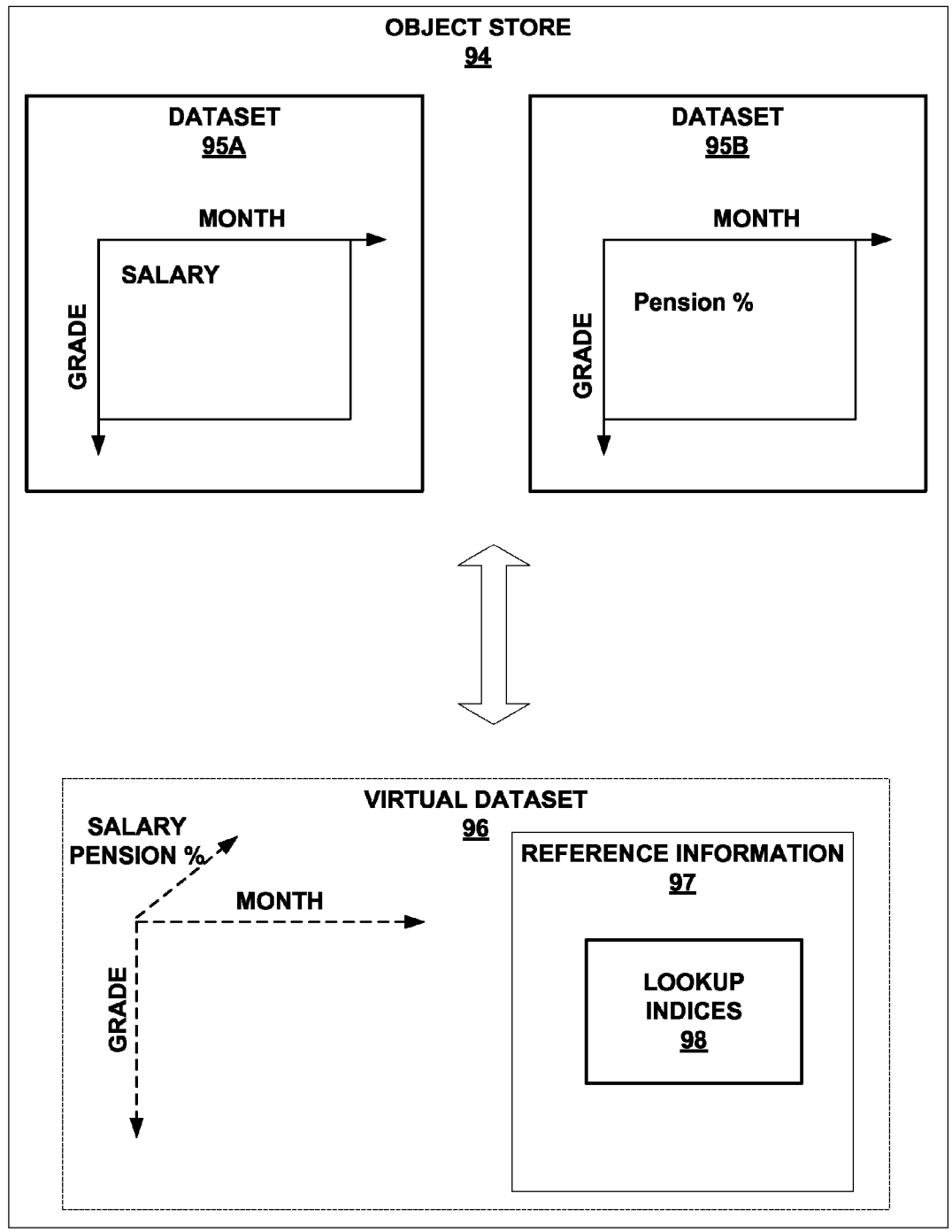
FIGS. 9A, 9B are block diagrams illustrating exemplary object stores 94, 99 that stores the result of two variations of an exemplary compound operation.
Figure 9B:
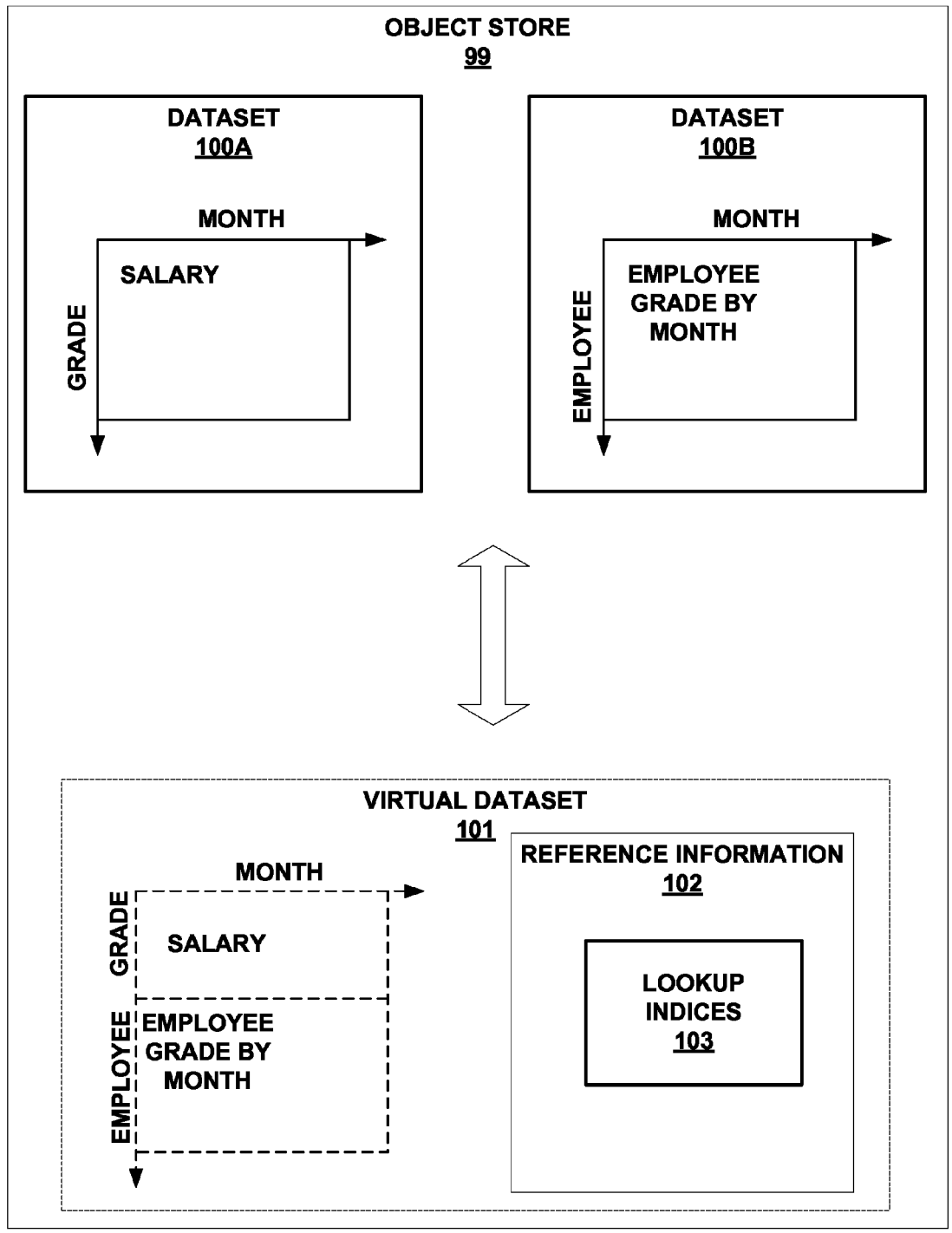

FIGS. 9A, 9B are block diagrams illustrating exemplary object stores 94, 99 that stores the result of two variations of an exemplary compound operation. The first variation of the compound operation is referred to herein as a "stacking" compound operation, and the second variation is referred to herein as an "appending" compound operation. As described below, the stacking compound operation stacks datasets and/or virtual datasets having common dimensions, while the appending compound operation appends datasets and/or virtual datasets having all but one dimension in common. Object stores 94, 99 may be substantially similar to object store 30 of FIG. 2.

As shown in FIG. 9A, object store 94 stores datasets 95A, 95B, and a virtual dataset 96, where virtual dataset 96 stores the result of a stacking compound operation. Initially, object store 94 only stores datasets 95A, 95B until an object model, such as object model 28, receives a stacking compound operation via API 27, which may cause object model 28 to build virtual dataset 96. Planning applications 25 invoke the stacking compound operation via API 27 according to the following syntax in order to cause object model 28 to build virtual dataset 96:

<Result>=compound(<Source1>, <Source2> . . . <SourceN>)

In the illustrated embodiment of FIG. 9A, planning applications 25 specify dataset 95A by its name "Salary" in the <Source1> field, dataset 95B by its name "Pension %" in the <Source2> field, and new virtual dataset 97 by its name in the <Result> field. As shown by the above syntax, planning applications 25 may utilize the stacking compound operation to combine any number of datasets and/or virtual datasets, as the stacking compound operation, similar to the selection operation, is not limited for use on strictly datasets.

Dataset 95A comprises an object of type salary that references grade and month dimensions. Dataset 95B comprises an object of type numerical (Pension %) that references grade and month dimensions. The result of this example stacking compound operation is a three-dimensional result dataset. The dimensions of the resultant virtual dataset 96 are: <New>, Grade, Month, where <New> is a newly generated two-member dimension containing the members "Salary" and "Pension %", i.e. one member for each source dataset. Reference information 97 references respective grade and month dimensions and includes lookup indices 98. Virtual dataset 96 differs from those described above, in that it references entirely datasets 95A, 95B and not a combination of select items within those datasets 95A, 95B. Lookup indices 98, therefore, contain lookup indices for referencing both of datasets 95A, 95B in their entirety, once resolved; otherwise lookup indices 98 act as a placeholder until resolved by object model 28.

Upon receiving this stacking compound operation, object model 28 first determines whether the two datasets are compatible, i.e., whether datasets 95A, 95B maintain all of their respective dimensions in common. If not compatible, object model 28 does not perform the stacking compound operation. However, if compatible, object model 28 proceeds to perform the stacking compound operation by creating reference information 97, and in particular, lookup indices 98, as a placeholder such that upon resolution of virtual dataset 96, lookup indices 98 reference both of datasets 95A, 95B in their entirety. Object model 28 arranges reference information 98 such that the reference to datasets 95A, 95B share their common dimensions, which in the illustrated example comprises the "grade" and "month" dimensions. As described above, after storing virtual dataset 96, object model 28 may return a reference to virtual dataset 96 via object model interface 26 such that planning applications 25 may access virtual dataset 96. Also, as described above with respect to the selection operation, planning applications 25 may demand resolution of virtual dataset 96, and object model 28 may resolve virtual dataset 96 in the manner described above.

Referring to FIG. 9B, object store 99 stores datasets 100A, 100B, and a virtual dataset 101, where virtual dataset 101 stores the result of an appending compound operation. Initially, object store 99 only stores datasets 100A, 100B until an object model, such as object model 28, receives an appending compound operation via API 27, which may cause object model 28 to build virtual dataset 101. Planning applications 25 invoke the appending compound operation via API 27 according to the following syntax in order to cause object model 28 to build virtual dataset 101:

<Result>=compound(<Source1>, <Source2> . . . <SourceN>)

In the illustrated embodiment of FIG. 9B, planning applications 25 specify dataset 100A by its name "Salary" in the <Source1> field, dataset 100B by its name "EmployeeGradeByMonth" in the <Source2> field, and new virtual dataset 101 by its name in the <Result> field. Whether a stacking compound operation or appending operation is desired is inferred from whether the input datasets have all dimensions in common (stacking), or whether they have at most one dimension unique to each (appending). Further, the appending order may be determined from the order of the source datasets supplied to the compound operation. As shown by the above syntax, planning applications 25 may utilize the appending compound operation to combine any number of datasets and/or virtual datasets, as the appending compound operation, similar to the selection operation, is not limited for use on strictly datasets.

Dataset 100A comprises an object of type salary that references grade and month dimensions. Dataset 100B comprises an object of type employee grade that references employee and month dimensions. Virtual dataset 101 comprises an object of two types, salary and employee grade, having reference information 102 that references respective month and grade/employee dimensions and includes lookup indices 103. The dashed box of virtual dataset 101 differs from those described above, in that it references entirely datasets 100A, 100B and not a combination of select items within those datasets 100A, 100B. FIG. 9B represents this virtual compound dataset 101 via the dashed box, where the upper half of the box references dataset 100A, as shown by the name "Salary," and the lower half of the box references dataset 100B, as shown by the name "EmployeeGradeByMonth." Lookup indices 103, therefore, contain lookup indices for referencing both of datasets 100A, 100B in their entirety, once resolved; otherwise lookup indices 103 act as a placeholder until resolved by object model 28.

Upon receiving this appending compound operation, object model 28 first determines whether the two datasets are compatible, i.e., whether datasets 95A, 95B maintain only a single uncommon dimension. If not compatible, object model 28 does not perform the appending compound operation. However, if compatible, object model 28 proceeds to perform the appending compound operation by creating reference information 102, and in particular, lookup indices 103, as a placeholder such that upon resolution of virtual dataset 101, lookup indices 103 reference both of datasets 100A, 100B in their entirety. Object model 28 arranges reference information 102 such that the reference to datasets 100A, 100B share their common dimensions, which in the illustrated example comprises the "month" dimension. As described above, after storing virtual dataset 101, object model 28 may return a reference to virtual dataset 101 via object model interface 26 such that planning applications 25 may access virtual dataset 101. Also, as described above with respect to the selection operation, planning applications 25 may demand resolution of virtual dataset 101, and object model 28 may resolve virtual dataset 101 in the manner described above.

In this way, planning applications 25 may quickly create virtual compound datasets, such as virtual datasets 96, 101, through the invocation of the two variations of the compound operation. These virtual compound datasets may enable planning applications 25 to arrange multiple sources of data for easy presentation to a user via a single grid of numbers or spreadsheet-like view, unlike conventional enterprise planning systems that require the users to switch between a number of grids of numbers or spreadsheet-like views.

Figure 10:
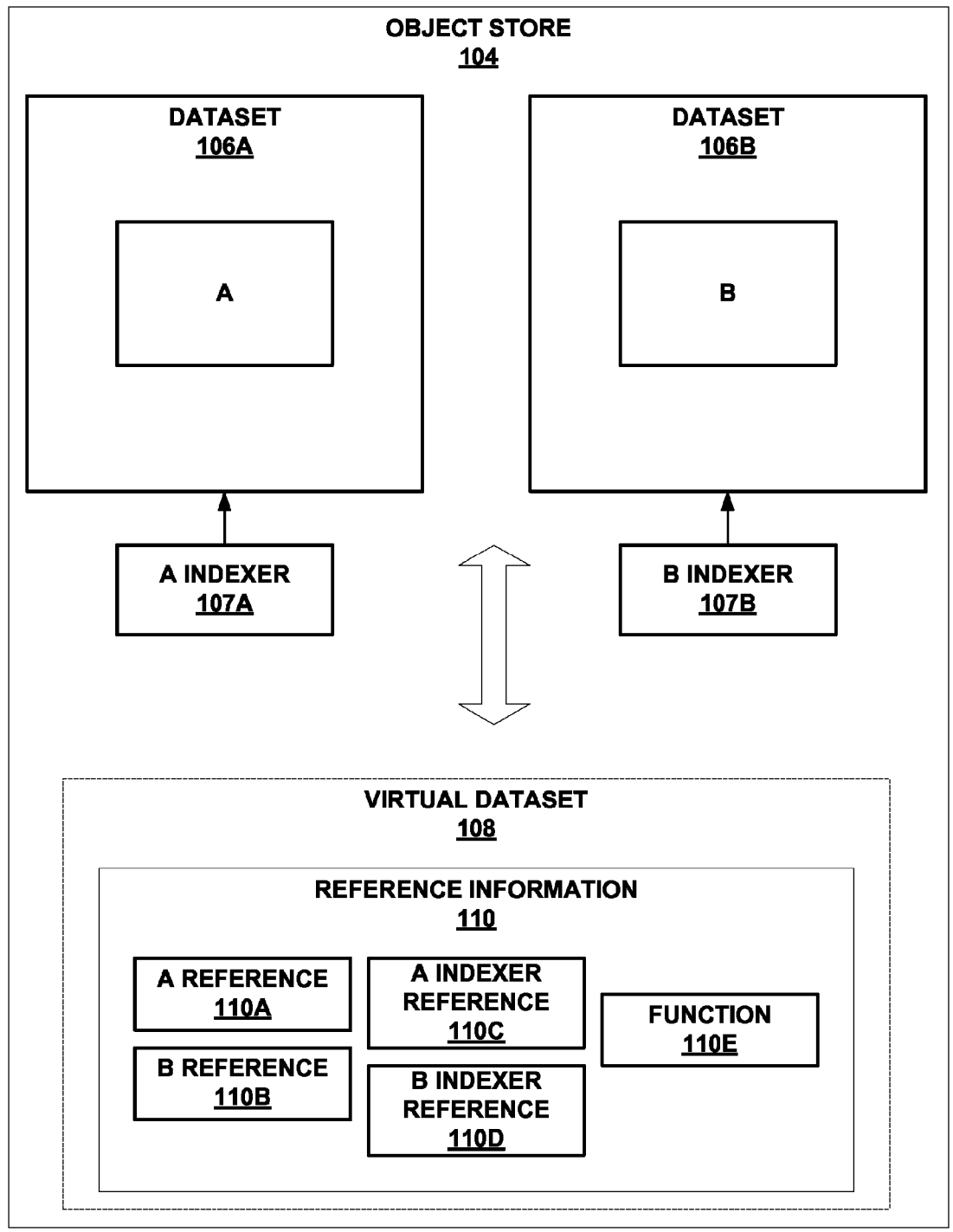
FIG. 10 is a block diagram illustrating another exemplary object store that stores the result of an exemplary function operation.

FIG. 10 is a block diagram illustrating another exemplary object store 104 that stores the result of an exemplary function operation. Object store 104 may be substantially similar to object store 30 of FIG. 2.

As shown in FIG. 10, object store 104 stores datasets 106A, 106B, indexers 107A, 107B, and a virtual dataset 108. Initially, object store 104 only stores datasets 106A, 106B and indexers 107A, 107B until an object model, such as object model 28, receives a function operation via API 27, which may cause object model 28 to build virtual dataset 108. Indexer 107A, 107B respectively comprise an indexer into dataset 106A, 106B, hence the names "A Indexer" and "B Indexer," as shown in FIG. 10. Virtual dataset 108 is an exemplary embodiment of a virtual function dataset. Planning applications 25 invoke the function operation via API 27 according to the following syntax in order to cause object model 28 to build virtual dataset 108:

<Result>=function(<Source1>, <Source2>, <Function>)

In the illustrated embodiment of FIG. 10, planning applications 25 specify dataset 106A by its name in the <Source1> field, dataset 106B by its name in the <Source2> field, a function in the <Function> field, and new virtual dataset 108 by its name in the <Result> field. Planning applications 25 may specify any sort of discreet mathematical operation in the <Function> field, such as addition, subtraction, multiplication, division, etc. Planning applications 25 may layer function operations, similar to the above described layering of selection operations, to perform complex mathematical operations involving numerous discreet mathematical and non-mathematical operations, such as string operations.

Dataset 106A, 106B and virtual dataset 108 are illustrated in a more generalized manner than datasets and virtual datasets of previous FIGS. Datasets 106A, 106B comprise respective object generally referred to as "A" and "B," which may each include an object of any type referencing any number of dimensions. Although shown as datasets, either or both of datasets 106A, 106B may be replaced with virtual datasets, as the function operation permits virtual datasets as sources. Virtual dataset 108 comprises reference information 110, where reference information specifies A references 110A, B references 110B, an A indexer reference 110C, a B indexer reference 110D, and a function 110E once resolved; otherwise, reference information 110 acts as a placeholder until resolved, as described above.

Once resolved, A references 110A represent references to dataset 106A, which is generically termed "A." B references 110B represent references to dataset 106B, which is generically termed "B." A indexer reference 110C represents a reference to A indexer 107A, where A indexer 107A is an object capable of retrieving the underlying items of object A specified by dataset 106A in a particular order. B indexer reference 110D represents a reference to B indexer 107B, where B indexer 107B is an object capable of retrieving the underlying items of object B specified by dataset 106B in a particular order. Finally, function 110E specifies the discreet mathematical function to apply to datasets 106A, 106B and defined by planning applications 25 in the <Function> field.

Upon receiving this function operation, object model 28 first determines whether the datasets 106A, 106B are compatible. Object model 28 determines whether datasets 106A, 106B are compatible by comparing the dimensionalities of each of datasets 106A, 106B. If the dimensionalities do not match, object model 28 does not perform the function operation. However, if the dimensionalities match, object model 28 proceeds to perform the function operation by creating reference information 110, and in particular, A references 110A, B references 110B, A indexer reference 110C, B indexer reference 110D, and function 110E as placeholders until object model 28 receives a demand for resolution of virtual dataset 108. As described above, after storing virtual dataset 100, object model 28 may return a reference to virtual dataset 108 via object model interface 26 such that planning applications 25 may access virtual dataset 108. Also, as described above with respect to the selection operation, planning applications 25 may demand resolution of virtual dataset 108 In response to this demand, object model 28 may resolve virtual dataset 108 by calculating A references 110A, B references 110B, A indexer reference 110C, and B indexer reference 110D.

In this way, planning applications 25 may quickly create virtual function datasets, such as virtual dataset 108, through the invocation of the function operation. These virtual function datasets may enable planning applications 25 to layer multiple function operations to perform complex mathematical functions on datasets and virtual datasets alike. Because virtual function datasets need not be resolved until demanded, they take up less space in memory, remain synchronized despite changes to the underlying items, and require little computation to create relative to datasets. Thus, using the function operation, planning applications 25 may quickly organize complicated mathematical functions via layers of virtual function datasets, such as virtual dataset 108, and only demand the actual results of the complicated mathematical functions when needed, thereby limiting costly computations during the organizational process.

Figure 11:
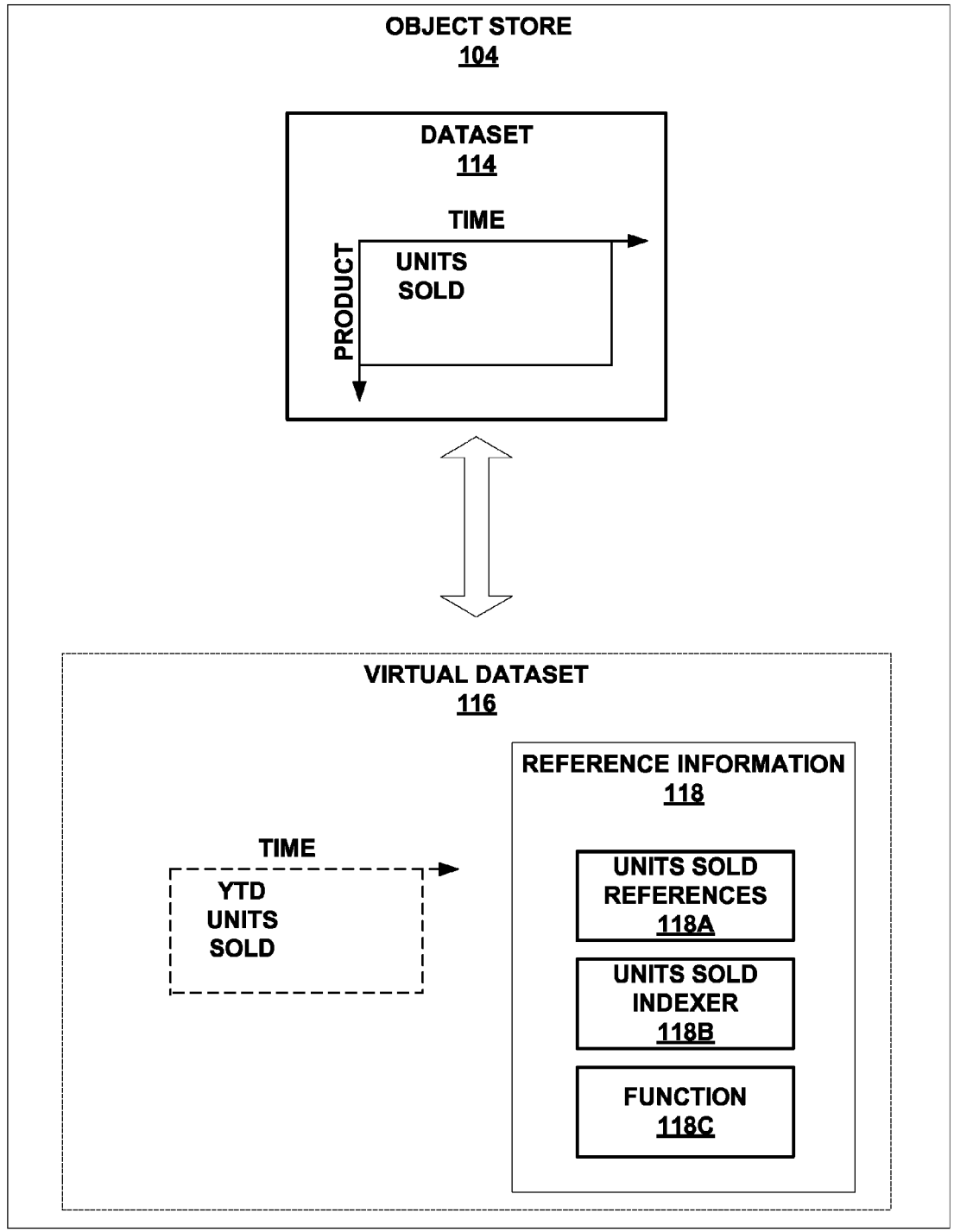
FIG. 11 is a block diagram illustrating another exemplary object store that stores the result of an exemplary sequential operation that enables planning applications to perform time-series calculation.

FIG. 11 is a block diagram illustrating an object store 112 that stores the result of an exemplary sequential operation that enables planning applications, such as planning applications 25 of FIG. 2, to perform time-series calculation. The sequential operation may comprise a sub-function of the function operation or may be an independent operation. It is herein described as a sub-function of the function operation; however, the principles of the invention should not be limited as such. Object store 112 may be substantially similar to object store 30.

As shown in FIG. 11, object store 112 stores datasets 114 and a virtual dataset 116. Initially, object store 112 only stores datasets 114 until an object model, such as object model 28, receives a function operation via API 27, which may cause object model 28 to build virtual dataset 116. Virtual dataset 116 is an exemplary embodiment of a virtual time-series, or sequence, dataset. Planning applications 25 invoke the function operation via API 27 according to the following syntax in order to cause object model 28 to build virtual time-series dataset 116:

YTDUnitsSold=function(UnitsSold, YTD, Current_Date).

In the illustrated embodiment of FIG. 11, planning applications 25 specify dataset 114 by its name "UnitsSold" in the <Source1> field, the year-to-date ("YTD") function in the <Function> field, Current_Date represents the current date, and new virtual dataset 116 by its name "YTDUnitsSold" in the <Result> field. In some embodiments, the Current_Date parameter may not be necessary if a time dimension is still present in the resulting YTDUnitsSold dataset. Planning applications 25 may layer sequential operations, similar to the above described layering of selection operations, to perform complex sequential operations involving numerous time-series operations.

Dataset 114 comprises an object referred to as "UnitsSold" of type units that references the time and product dimensions. Virtual dataset 116 comprises reference information 118, where reference information specifies UnitsSold references 118A, UnitsSold indexer 118B, and function 118C as placeholders until resolved. Once resolved, UnitsSold references 118A represent references to dataset 114. UnitsSold indexer 118B represents an object capable of retrieving the underlying items of the UnitsSold object specified by dataset 114 in a particular order. Function 118C specifies the YTD function to apply to datasets 114 and defined by planning applications 25 in the <Function> field.

Upon receiving this function operation, object model 28 ordinarily determines compatibility, which it may do by determining whether dataset 114 varies by a dimension of type time. Here, dataset 114 varies by the time dimension, and object model 28 determines that dataset 114 is compatible with the time-series YTD function. If dataset 114 did not vary by a time increment, object model 28 typically rejects the sequence function, as it is necessary to perform the YTD function. Object model 28 knows to perform this compatibility test based upon the function type specified in the <Function> field of the function operation. Moreover, based on type of function specified by the function field, object model 28 generates virtual time-series dataset 116 in the manner described below.

Upon determining compatibility, object model 28 proceeds to perform the sequence operation by creating reference information 118, and in particular, UnitsSold references 118A, UnitsSold indexer 118B, and function 118C as placeholders until resolved. Unlike the previous function operation described in reference to FIG. 10, this sub-function, or sequence, operation does not compute a mathematical function in reference to two or more datasets. Instead, the sequence operation, such as the YTD function, computes a total YTD calculation upon a single dataset 114. The previous function operation computes a mathematical function on a cell to cell basis by referencing items pairs, applying the function, and storing the result, when resolved. Object model 28 does not perform this scalar computation in this instance, but instead performs its computation at the list level, when resolved. Thus, object model 28 generates reference information 118 such that it may perform these list level computations upon receiving a demand to resolve virtual dataset 116.

In other words, object model 28 generates virtual dataset 116 such that it represents a one-dimensional sub-selection of UnitsSold dataset 114 locked on to a single product at a time. FIG. 11 illustrates this by including within virtual dataset 116 a dashed-box showing YTDUnitsSold varying by the single dimension labeled "Time." The resulting virtual dataset 116, in this example, no longer includes the time dimension, but only varies by product. In other words, a single number has been calculated for each product. Upon receiving a demand for resolution, object model 28 calculates reference information 118 such that it specifies a method to move to the next product specified within the product dimension of dataset 114 via UnitsSold indexer 118B. In response to the demand, object model 28 further accesses reference information 118 to position the YTD calculation on a first product, computes the YTD for that product, and repeats this process until a YTD calculation exists for each product along the product dimension of dataset 114.

Although not shown in FIG. 11, dataset 114 may include more than two dimensions. For example, dataset 114 may include an additional dimension titled "Channel" by which UnitsSold may vary. If object model 28 performed this YTD calculation upon the three dimensional dataset 114, object model 28 would generate additional reference information 118 to navigate dataset 114 so as to successfully calculate a YTD number for each product and channel. In this example, the additional reference information may specify how to navigate a two-dimensional sub-dataset, i.e., product by channel dataset, instead of the single-dimensional sub-dataset, i.e., product dataset.

In some embodiments, a virtual dataset may define a custom view of an underlying dataset. For example, an indexer object associated with the virtual dataset may sequentially follow a pattern described by the custom view, yet traverse the underlying dataset in a non-sequential pattern. Moreover, the indexer may not necessarily traverse all of the elements of the dataset, and may access some of the elements multiple times depending on the defined view. Examples of indexer objects that may be used with virtual dataset are described in U.S. patent application Ser. No. 11/563,485, filed Nov. 27, 2006, entitled ENTERPRISE PLANNING AND PERFORMANCE MANAGEMENT SYSTEM PROVIDING DOUBLE DISPATCH RETRIEVAL OF MULTIDIMENSIONAL DATA, the contents of which are incorporated herein by reference.

While described herein in reference to a computing device, the invention may reside within other contexts, such as an enterprise planning system. In this embodiment, the enterprise planning system may comprise similar components as the computing device described herein, such as an object model interface, an object model, and an object store. Typically, in this embodiment, each computing device would receive their own allocation of memory within the enterprise planning system to which the object model interface, the object model, and the object store would be stored. The computing devices would interact with enterprise planning system to make selections, as described herein; however, the virtual datasets would reside within the object store on the enterprise planning system, instead of within the computing device.

Finally, while described herein in reference to various computing devices and enterprise planning systems, the principles of the invention may apply equally to a processor capable of executing instructions stored to a computer-readable medium. The instructions may cause the processor to perform the various functions pertinent to the invention, as described above. Various embodiments of the invention have been described. These and other embodiments are within the scope of the following claims.

The invention claimed is:

1. A computer-implemented method comprising:
storing a dataset to an object store in accordance with an object model via an application programming interface (API), wherein the dataset stores multidimensional data from a data cube;
invoking the API to perform a first operation and produce a virtual dataset from the dataset, wherein the virtual dataset is defined as a data cube having dimensionality based upon the first operation without allocation of space to store multidimensional data and without computing and storing reference information for subsequent resolution to the multidimensional data, and wherein the virtual dataset allocates space to store the reference information;
storing the virtual dataset to the same object store in accordance with the object model via the API, wherein the API remains consistent by enabling the storage of both the dataset and the virtual dataset to the same object store and in accordance with the same object model;
utilizing the virtual dataset in a second operation defined within the API without resolving the virtual dataset to access the multidimensional data of the dataset in response to the second operation;
receiving a demand to resolve the virtual dataset via the API; and
in response to the demand, resolving the virtual dataset, wherein resolving the virtual dataset includes computing and storing the reference information to the allocated space of the virtual dataset so as to retrieve the multidimensional data of the dataset.

2. The method of claim 1, wherein specifying the virtual dataset includes specifying a virtual selection dataset via a selection operation defined within the API with the plurality of applications.

3. The method of claim 2, wherein specifying the virtual selection dataset includes:
specifying the virtual selection dataset via the selection operation that defines the dataset as a source dataset and at least one other dataset as a selector dataset with the plurality of applications;
determining the compatibility of the source dataset and the selector dataset; and
storing the virtual selection dataset to the object store with the object model based on the determination.

4. The method of claim 3, further comprising:
receiving a demand to resolve the virtual selection dataset from the plurality of applications with the object model via the API; and
resolving the virtual selection dataset with the object model using the reference information, wherein the reference information references a selection of items of the source dataset.

5. The method of claim 3, further comprising:
receiving a demand to resolve the virtual selection dataset from the plurality of applications with the object model via the API;
resolving the virtual selection dataset with the object model using the reference information, wherein the reference information references a projection of items of the source dataset onto the selection dataset.

6. The method of claim 1, wherein specifying the virtual dataset includes specifying a virtual compound dataset via a compound operation defined within the API with the plurality of applications.

7. The method of claim 6, wherein specifying a virtual compound dataset includes:
specifying the virtual compound dataset via the compound operation that defines the dataset as a first source dataset and another dataset as second source dataset; and
storing the virtual compound dataset to the object store with the object model.

8. The method of claim 7, further comprising:
receiving a demand to resolve the virtual compound dataset from the plurality of applications with the object model via the API;
resolving the virtual compound dataset with the object model using the reference information, wherein the reference information entirely references both of the first and second source datasets.

9. The method of claim 1, wherein specifying the virtual dataset includes specifying a virtual function dataset via a function operation defined within the API with the plurality of applications.

10. The method of claim 9, wherein specifying the virtual function dataset includes:
specifying the virtual function dataset via the function operation that defines the dataset as a first source dataset, another dataset as a second source dataset, and a function;
determining the compatibility of the first and second dataset; and storing the virtual function dataset to the object store based on the determination.

11. The method of claim 10, further comprising:
receiving a demand to resolve the virtual function dataset from the plurality of applications with the object model via the API;
resolving the virtual function dataset with the object model using the reference information, wherein the reference information references a sequence of items of the first source dataset and a sequence of items of the second source dataset and stores the function.

12. The method of claim 1, wherein the virtual data set defines a custom view of the data set, the method comprising following a pattern described by the custom view to traverse the underlying dataset in a non-sequential pattern.

13. The method of claim 1, wherein invoking the API to perform a first operation includes applying a time-series function to the dataset to produce the virtual dataset.

14. The method of claim 13, further comprising determining the compatibility of the source dataset with the time-series function and rejecting the sequence function if the dataset does not vary by a time increment.

15. The method of claim 1, further comprising:
receiving a demand to resolve the virtual dataset from one of the plurality of applications with the object model via the API; and
resolving the virtual dataset with the object model using the reference information, wherein the reference information references one or more items of the dataset.

16. The method of claim 1, wherein utilizing the virtual dataset further includes utilizing the virtual dataset in one or more of a selection operation, a compound operation, a function operation, and a sequence operation defined within the API without resolving the virtual dataset.

17. A computing device comprising:
a computer-readable storage medium including an object store that stores a dataset having multidimensional data arranged along multiple dimensions;
a hardware processor that executes an application programming interface (API) that defines an operation for specifying a virtual dataset from the dataset; and
an object model that stores the virtual dataset to the object store of the computer-readable storage medium in response to receiving the operation defined by the API, wherein the object model creates the virtual dataset as a data cube having dimensionality based upon the operation without allocation of space to store multidimensional data and without computing and storing reference information for subsequent resolution to the multidimensional data of the dataset, and wherein object model creates the virtual dataset to allocate space to store the reference information for subsequent resolution to the multidimensional data of the dataset,
wherein the object model stores the virtual dataset to the same object store via the API, wherein the API remains consistent by enabling the storage of both the dataset and the virtual dataset to the same object store and in accordance with the same object model, and
wherein the processor executes an enterprise software application that invokes the API to utilize the virtual dataset for a further operation without resolving the virtual dataset to access the multidimensional data of the dataset in response to the further operation, receive a demand to resolve the virtual dataset via the API and, in response to the demand, resolve the virtual dataset, by computing and storing the reference information to the allocated space of the virtual dataset so as to retrieve the multidimensional data of the dataset.

18. The computing device of claim 17,
wherein the API defines the operation by defining a selection operation for specifying a virtual selection dataset, and
wherein the object model stores the virtual dataset by storing the virtual selection dataset to the object store in response to receiving the selection operation via the API.

19. The computing device of claim 18,
wherein the processor further executes a plurality of applications that specify the virtual selection dataset via the selection operation by defining the dataset as a source dataset and at least one other dataset as the selector dataset within the selection operation, and
wherein the object model further determines the compatibility of the source dataset and the selector dataset and stores the virtual selection dataset to the object store based on the determination.

20. The computing device of claim 19, wherein the object model further receives a demand to resolve the virtual selection dataset from the plurality of applications via the API and resolves the virtual selection dataset using the reference information to reference a selection of the items of the source dataset.

21. The computing device of claim 19, wherein the object model further receives a demand to resolve the virtual selection dataset from the plurality of applications via the API and resolves the virtual selection dataset using the reference information to reference a projection of items of the source dataset onto the selection dataset.

22. The computing device of claim 17,
wherein the API defines the operation by defining a compound operation for specifying a virtual compound dataset that combines multiple datasets, and
wherein the object model stores the virtual dataset by storing the virtual compound dataset to the object store in response to receiving the compound operation via the API.

23. The computing device of claim 22,
wherein the processor further executes a plurality of applications that specify the virtual compound dataset via the compound operation by defining the dataset as a first source dataset and at least one other dataset as a second source dataset within the compound operation, and
wherein the object model further stores the virtual compound dataset to the object store.

24. The computing device of claim 23, wherein the object model further receives a demand to resolve the virtual compound dataset from the plurality of applications via the API and resolves the virtual compound dataset using the reference information to entirely reference both of the first and second source datasets.

25. The computing device of claim 17,
wherein the API defines the operation by defining a function operation for specifying a virtual function dataset as a result of perform a mathematical operation on the dataset, and
wherein the object model stores the virtual dataset by storing the virtual function dataset to the object store in response to receiving the function operation via the API.

26. The computing device of claim 25,
wherein the processor further executes a plurality of applications that specify the virtual function dataset via the function operation by defining the dataset as a first source dataset, another dataset as a second source dataset, and a function within the function operation, and wherein the object model further determines the compatibility of the first and second source datasets and stores the virtual function dataset to the object store by storing the virtual function dataset to the object store based on the determination.

27. The computing device of claim 26, wherein the object model further receives a demand to resolve the virtual function dataset from the plurality of applications via the API and resolves the virtual function dataset using the reference information to reference a sequence of items of the first source dataset and a sequence of items of the second source dataset and stores the function.

28. The computing device of claim 17, wherein the virtual data set defines a custom view of the data set, wherein the custom specifies a non-sequential pattern to traverse the underlying dataset.

29. The computing device of claim 17, wherein the virtual dataset is a time-series dataset, and the object model applies a time-series function to the dataset to produce the virtual dataset.

30. The computing device of claim 29, wherein the object model further receives a demand to resolve the virtual sequence dataset from the plurality of applications via the API and resolves the virtual sequence dataset using the reference information to reference the source dataset and stores the time-series function.

31. The computing device of claim 17, wherein the object model further receives a demand to resolve the virtual dataset from one of the plurality of applications via the API and resolves the virtual dataset using the reference information to reference one or more items of the dataset.

32. The computing device of claim 17, wherein the processor executes a planning application that utilizes the virtual dataset by utilizing the virtual dataset for one or more of a selection operation, a compound operation, a function operation, and a sequence operation defined within the API without resolving the virtual dataset.

33. A system comprising:
an enterprise planning system; and
a computing device coupled to the enterprise planning system via a network connection comprising
a computer-readable storage medium including an object store that stores a dataset having multidimensional data arranged along multiple dimensions;
a hardware processor that executes an application programming interface (API) that defines an operation for specifying a virtual dataset from the dataset; and
an object model that stores the virtual dataset to the object store of the computer-readable storage medium in response to receiving the operation defined by the API, wherein the object model creates the virtual as a data cube having dimensionality based upon the operation without allocation of space to store multidimensional data and without computing and storing reference information for subsequent resolution to the multidimensional data of the dataset, and wherein object model creates the virtual dataset to allocate space to store reference information for subsequent resolution to the multidimensional data of the dataset,
wherein the object model stores the virtual dataset to the same object store via the API, wherein the API remains consistent by enabling the storage of both the dataset and the virtual dataset to the same object store and in accordance with the same object model, and
wherein the processor executes an enterprise software application that invokes the API to utilize the virtual dataset for a further operation without resolving the virtual dataset to access the multidimensional data of the dataset in response to the further operation, receive a demand to resolve the virtual dataset via the API and, in response to the demand, resolve the virtual dataset, by computing and storing the reference information to the allocated space of the virtual dataset so as to retrieve the multidimensional data of the dataset.

34. A computer-readable storage medium comprising instructions for causing a programmable processor to:
store a dataset to an object store in accordance with an object model via an application programming interface (API), wherein the dataset stores multidimensional data from a data cube;
invoke the API to perform a first operation and produce a virtual dataset from the dataset, wherein the virtual dataset is defined as a data cube having dimensionality based upon the first operation without allocation of space to store multidimensional data and without computing and storing reference information for subsequent resolution to the multidimensional data, and wherein the virtual dataset allocates space to store the reference information;
store the virtual dataset to the same object store in accordance with the object model via the API, wherein the API remains consistent by enabling the storage of both the dataset and the virtual dataset to the same object store and in accordance with the same object model;
utilize the virtual dataset in a second operation defined within the API without resolving the virtual dataset to access the multidimensional data of the dataset in response to the second operation;
receive a demand to resolve the virtual dataset via the API; and
in response to the demand, resolve the virtual dataset, wherein resolving the virtual dataset includes computing and storing the reference information to the allocated space of the virtual dataset so as to retrieve the multidimensional data of the dataset.

* * * * *